US012327835B2

(12) United States Patent
Frischmann et al.

(10) Patent No.: US 12,327,835 B2
(45) Date of Patent: *Jun. 10, 2025

(54) ELECTROCHEMICAL CELLS WITH IONIC SEQUESTRATION PROVIDED BY POROUS SEPARATORS

(71) Applicant: Sepion Technologies, Inc., Oakland, CA (US)

(72) Inventors: Peter David Frischmann, Oakland, CA (US); Brett Anthony Helms, Oakland, CA (US); Jon-Michael Alessandro, Oakland, CA (US)

(73) Assignee: Sepion Technologies, Inc., Alameda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,025

(22) Filed: Jun. 23, 2022

(65) Prior Publication Data

US 2023/0131565 A1    Apr. 27, 2023

Related U.S. Application Data

(63) Continuation of application No. 16/335,219, filed as application No. PCT/US2017/054069 on Sep. 28, 2017, now Pat. No. 11,394,082.

(Continued)

(51) Int. Cl.
*H01M 10/052* (2010.01)
*H01M 4/505* (2010.01)
(Continued)

(52) U.S. Cl.
CPC ..... *H01M 10/0525* (2013.01); *H01M 50/414* (2021.01); *H01M 50/417* (2021.01);
(Continued)

(58) Field of Classification Search
CPC ........... H01M 10/0525; H01M 50/414; H01M 50/417; H01M 50/42; H01M 50/423;
(Continued)

(56) References Cited

U.S. PATENT DOCUMENTS

| 4,071,665 A | 1/1978 | Garth |
| 4,397,922 A | 8/1983 | Pokhodenko et al. |

(Continued)

FOREIGN PATENT DOCUMENTS

| CN | 107213807 A | 9/2017 |
| JP | S62252067 A | 11/1987 |

(Continued)

OTHER PUBLICATIONS

Extended European Search Report for Application No. 19850375.7, mailed on Jan. 27, 2022, 5 pages.

(Continued)

*Primary Examiner* — Christian Roldan
(74) *Attorney, Agent, or Firm* — Mintz, Levin, Cohn, Ferris, Glovsky and Popeo, P.C.

(57) ABSTRACT

Provided are electrochemical cells including separators permeable to some materials and impermeable to other materials in electrolytes. Also provide are methods of forming such separators. The selective permeability of a separator is achieved by its specific pore diameter and a narrow distribution of this diameter. Specifically, a species responsible for ion transport in an electrochemical cell are allowed to pass through the separator, while another species is blocked thereby preventing degradation of the cell. For example, a species containing lithium ions is allowed to pass in rechargeable cells, while one or more species containing transition metals are blocked. In some embodiments, a separator may include a membrane layer with at least 90% of pores of this having a diameter of between about 0.1

(Continued)

nanometers and 1.0 nanometer. The membrane layer may be a standalone layer or supported by a membrane support.

21 Claims, 16 Drawing Sheets

Related U.S. Application Data

(60) Provisional application No. 62/401,046, filed on Sep. 28, 2016.

(51) Int. Cl.
| | |
|---|---|
| *H01M 4/587* | (2010.01) |
| *H01M 10/0525* | (2010.01) |
| *H01M 10/056* | (2010.01) |
| *H01M 50/414* | (2021.01) |
| *H01M 50/417* | (2021.01) |
| *H01M 50/42* | (2021.01) |
| *H01M 50/423* | (2021.01) |
| *H01M 50/426* | (2021.01) |
| *H01M 50/431* | (2021.01) |
| *H01M 50/437* | (2021.01) |
| *H01M 50/44* | (2021.01) |
| *H01M 50/449* | (2021.01) |
| *H01M 50/451* | (2021.01) |
| *H01M 50/457* | (2021.01) |
| *H01M 50/489* | (2021.01) |
| *H01M 50/497* | (2021.01) |

(52) U.S. Cl.
CPC ......... *H01M 50/42* (2021.01); *H01M 50/423* (2021.01); *H01M 50/426* (2021.01); *H01M 50/437* (2021.01); *H01M 50/44* (2021.01); *H01M 50/451* (2021.01); *H01M 50/457* (2021.01); *H01M 50/497* (2021.01)

(58) Field of Classification Search
CPC .. H01M 50/426; H01M 50/437; H01M 50/44; H01M 50/451; H01M 50/457; H01M 50/497; H01M 10/052; H01M 4/505; H01M 4/587; H01M 50/489; H01M 10/056; H01M 50/411; H01M 50/431; H01M 50/449; Y02E 60/10
USPC .......................................................... 425/154
See application file for complete search history.

(56) References Cited

U.S. PATENT DOCUMENTS

| | | | |
|---|---|---|---|
| 4,485,154 A | 11/1984 | Remick et al. | |
| 4,592,973 A | 6/1986 | Pemsler et al. | |
| 4,808,497 A | 2/1989 | Blomgren et al. | |
| 5,858,264 A | 1/1999 | Ichino et al. | |
| 6,218,054 B1 | 4/2001 | Webber | |
| 6,586,138 B2 | 7/2003 | Pekala et al. | |
| 7,690,514 B2 | 4/2010 | Mckeown et al. | |
| 7,758,751 B1 | 7/2010 | Liu et al. | |
| 8,056,732 B2 | 11/2011 | Mckeown et al. | |
| 9,481,939 B2 | 11/2016 | Masel et al. | |
| 9,580,824 B2 | 2/2017 | Masel et al. | |
| 9,815,032 B2 | 11/2017 | Hill et al. | |
| 10,710,065 B2 | 7/2020 | Helms et al. | |
| 10,862,093 B2 | 12/2020 | Hatta et al. | |
| 11,318,455 B2 | 5/2022 | Helms et al. | |
| 11,394,082 B2 | 7/2022 | Frischmann et al. | |
| 11,545,724 B2 | 1/2023 | Frischmann et al. | |
| 2004/0044100 A1 | 3/2004 | Schlenoff et al. | |
| 2005/0147891 A1 | 7/2005 | Mikhaylik et al. | |
| 2006/0134526 A1 | 6/2006 | Han et al. | |
| 2006/0246273 A1 | 11/2006 | Mckeown et al. | |
| 2007/0264577 A1 | 11/2007 | Katayama et al. | |
| 2009/0050199 A1 | 2/2009 | Bartholomew et al. | |
| 2009/0136844 A1 | 5/2009 | Watanabe et al. | |
| 2009/0155678 A1 | 6/2009 | Less et al. | |
| 2010/0003570 A1 | 1/2010 | Finsterwalder et al. | |
| 2010/0261065 A1 | 10/2010 | Babinec et al. | |
| 2010/0304112 A1 | 12/2010 | Mckeown et al. | |
| 2012/0107701 A1 | 5/2012 | Iwaya | |
| 2012/0264589 A1 | 10/2012 | Du et al. | |
| 2013/0029232 A1 | 1/2013 | Zheng et al. | |
| 2014/0170459 A1 | 6/2014 | Wang et al. | |
| 2014/0212748 A1 | 7/2014 | Zhang et al. | |
| 2014/0255636 A1 | 9/2014 | Odeh et al. | |
| 2014/0287323 A1 | 9/2014 | Lu et al. | |
| 2015/0325828 A1* | 11/2015 | Herle ................. H01M 10/0525 |
| | | | 429/251 |
| 2016/0118636 A1 | 4/2016 | Jin et al. | |
| 2016/0263532 A1 | 9/2016 | Odeh et al. | |
| 2016/0285064 A1 | 9/2016 | Hatta et al. | |
| 2016/0367948 A1 | 12/2016 | Song et al. | |
| 2017/0077503 A1* | 3/2017 | Erickson ............. H01M 10/052 |
| 2017/0117536 A1 | 4/2017 | Choi et al. | |
| 2017/0179532 A1 | 6/2017 | Archer et al. | |
| 2017/0346104 A1 | 11/2017 | Helms et al. | |
| 2017/0369652 A1 | 12/2017 | Hefner et al. | |
| 2018/0065105 A1 | 3/2018 | Song et al. | |
| 2018/0085744 A1* | 3/2018 | Helms .................... C08J 5/2256 |
| 2018/0277313 A1 | 9/2018 | Tabuchi et al. | |
| 2019/0109310 A1 | 4/2019 | Masel et al. | |
| 2019/0245242 A1 | 8/2019 | Tan et al. | |
| 2019/0326578 A1 | 10/2019 | Frischmann et al. | |
| 2019/0348657 A1 | 11/2019 | Frischmann et al. | |
| 2020/0006796 A1 | 1/2020 | Su et al. | |
| 2020/0212492 A1 | 7/2020 | Collins et al. | |
| 2020/0306745 A1 | 10/2020 | Helms et al. | |
| 2020/0328475 A1 | 10/2020 | Hakari et al. | |
| 2021/0013536 A1 | 1/2021 | Golden et al. | |
| 2021/0104745 A1 | 4/2021 | Park et al. | |
| 2021/0309802 A1 | 10/2021 | Helms et al. | |
| 2023/0216082 A1 | 7/2023 | Ullman et al. | |
| 2023/0395862 A1 | 12/2023 | Suzuki et al. | |

FOREIGN PATENT DOCUMENTS

| | | |
|---|---|---|
| KR | 20140147742 A | 12/2014 |
| WO | 2005012397 A2 | 2/2005 |
| WO | 2005113121 A1 | 12/2005 |
| WO | 2009026467 A1 | 2/2009 |
| WO | 2012129411 A1 | 9/2012 |
| WO | 2013005050 A1 | 1/2013 |
| WO | 2015013478 A1 | 1/2015 |
| WO | 2015134783 A1 | 9/2015 |
| WO | 2016161367 A1 | 10/2016 |
| WO | 2017075577 A1 | 5/2017 |
| WO | 2017117373 A1 | 7/2017 |
| WO | 2018106957 A1 | 6/2018 |
| WO | 2019006045 A1 | 1/2019 |
| WO | 2020006436 A1 | 1/2020 |
| WO | 2020037246 A1 | 2/2020 |
| WO | 2020264386 A1 | 12/2020 |
| WO | 2021224825 A1 | 11/2021 |
| WO | 2022235931 A1 | 11/2022 |
| WO | 2024015957 A1 | 1/2024 |
| WO | 2024015971 A2 | 1/2024 |

OTHER PUBLICATIONS

Extended European Search Report for Application No. 17878273.6, mailed on Jun. 30, 2020, 8 pages.
Extended European Search Report for Application No. 17857439.8, mailed on Mar. 27, 2020, 8 pages.
International Search Report and Written Opinion for Application No. PCT/US2016/025712, mailed on Oct. 6, 2016, 10 pages.
International Search Report and Written Opinion for Application No. PCT/US2020/039867, mailed on Nov. 15, 2019, 15 pages.
International Search Report and Written Opinion for Application No. PCT/US2021/034203, mailed on Aug. 25, 2021, 9 pages.

(56) References Cited

OTHER PUBLICATIONS

International Search Report and Written Opinion for Application No. PCT/US2020/039942, mailed on Oct. 22, 2020, 15 pages.
International Search Report and Written Opinion for Application No. PCT/US2019/046886, mailed on Oct. 25, 2019, 8 pages.
International Search Report and Written Opinion for Application No. PCT/US2017/054069 mailed on Dec. 15, 2017, 10 pages.
International Search Report and Written Opinion for Application No. PCT/US2017/065174 mailed on Mar. 7, 2018, 7 pages.
Aetukuri et al. (2015) "Flexible Ion-Conducting Composite Membranes for Lithium Batteries", Advanced Energy Materials, 5(14):6 Pages.
Ahn et al. (2009) "Gas Transport Behavior of Mixed-Matrix Membranes Composed of Silica Nanoparticles in a Polymer of Intrinsic Microporosity (PIM-1 )", Journal of Membrane Science, 346(2):280-287.
Baran et al. (2019) "Design Rules for Membranes from Polymers of Intrinsic Microporosity for Crossover-free Aqueous Electrochemical Devices", Joule, 3(12):2968-2985(19 pages).
Bengtson et al. (2019) "Membranes of Polymers of Intrinsic Microporosity (PIM-1) Modified by Poly(ethylene glycol)", Membranes, 7(28):1-21.
Bisoi et al. (2017) "Gas Separation Properties of Troeger's Base-bridged Polyamides", e-Polymers, 17(4): 283-293.
Budd et al. (2008) "Gas Permeation Parameters and Other Physicochemical Properties of a Polymer of Intrinsic Microporosity: Polybenzodioxane PIM-1", Journal of Membrane Science, 325(2):851-860.
Carta et al. (2008) "Novel Spirobisindanes for Use as Precursors to Polymers of Intrinsic Microporosity", Organic Letters, Mar. 15, 2010(13):2641-2643.
Carta et al. (2014) "The synthesis of microporous polymers using Tröger's base formation", Polymer Chemistry, 5:5267-5272.
Doris et al. (Nov. 2016) "Understanding and Controlling the Chemical Evolution and Polysulfide-blocking Ability of Lithium-Sulfur Battery Membranes Cast from Polymers of Intrinsic Microporosity", Journal of Materials Chemistry A, 4(43):16946-16952.
Du et al. (2011) "Azide-Based Cross-Linking of Polymers of Intrinsic Microporosity (PI Ms) for Condensable Gas Separation", Macromolecular Rapid Communications, 32(8):631-636.
Emmler et al. (2010) "Free Volume Investigation of Polymers of Intrinsic Microporosity (PIMs): PIM-1 and PIM1 Copolymers Incorporating Ethanoanthracene Units", Macromolecules, 43(14):6075-6084.
Gross et al. (2018) "Rechargeable Zinc-Aqueous Polysulfide Battery with a Mediator-Ion Solid Electrolyte", ACS Applied Materials & Interfaces, 10(13):10612-10617.
Hart et al. (2014) "Ionomers of Intrinsic Microporosity: In Silica Development of Ionic-Functionalized Gas-Separation Membranes", Langmuir, 30(40):12039-12048.
Zhang et al. (2015) "Synthesis of Perfectly Alternating Copolymers for Polymers of Intrinsic Microporosity", Polymer Chemistry, 6:5003-5008.
International Search Report and Written Opinion for Application No. PCT/US2022/027867 mailed on Oct. 6, 2022, 24 pages.
Khan et al. (2013) "Cross-Linking of Polymer of Intrinsic Microporosity (PIM-1) via Nitrene Reaction and its Effect on Gas Transport Property", European Polymer Journal, 49:4157-4166.
Li et al. (Oct. 11, 2017) "Air-breathing Aqueous Sulfur Flow Battery for Ultra Low-cost Long-duration Electrical Storage", Joule, 1(2): 306-327.
Li et al. (2018) "Engineered Transport in Microporous Materials and Membranes for Clean Energy Technologies", Advanced Materials, 30:1704953.
Li et al. (Aug. 3, 2015) "Polysulfide-Blocking Micromorous Polymer Membrane Tailored for Hybrid Li-Sulfur Flow Batteries", Nano Letters, 15(9):5724-5729.
Madrid et al. (2014) "Metastable Ionic Diodes Derived from an Amine-Based Polymer of Intrinsic Microporosity", Angewandte Chemie, 53:10751-10754.
McKeown et al. (2010) "Exploitation of Intrinsic Microporosity in Polymer-Based Materials", Macromolecules, 43(12):5163-5176.
McKeown et al. (2006) "Polymers of Intrinsic Microporosity (PIMs): Organic Materials for Membrane Separations, Heterogeneous Catalysis and Hydrogen Storage", Chemical Society Reviews, 35(8):675-683.
McKeown et al. (2006) "Polymers of Intrinsic Microporosity (PI Ms): Bridging the Void Between Microporous and Polymeric Materials", Chemistry—A European Journal, 11(9):2610-2620.
McKeown, Neil B. (2012) "Polymers of Intrinsic Microporosity," International Scholarly Research Network, Article ID 513986, 16 pages.
Patel et al. (2012) "Noninvasive Functionalization of Polymers of Intrinsic Microporosity for Enhanced CO2 Capture", Chemical Communications, 48:9989-9991.
Zhang et al. (2015) "Charged Porous Polymers using a Solid C—O Cross-Coupling Reaction", Chemistry, 21(37):12866-12870.
Rose et al. (2017) "Polymer Ultrapermeability from The Inefficient Packing of 2D Chains", Nature Materials, 16(9):932-937.
Ward et al. (2017) "Materials Genomics Screens for Adaptive Ion Transport Behavior by Redox-Switchable Microporous Polymer Membranes in Lithium-Sulfur Batteries", ACS Central Science, 3(5):399-406.
Wei et al. (2016) "An Aqueous Redox Flow Battery Based on Neutral Alkali Metal Ferri/ferrocyanide and Polysulfide Electrolytes", Journal of The Electrochemical Society, 163(1):A5150-A5153.
Winsberg et al. (2017) "Aqueous 2,2,6,6-Tetramethylpiperidine-N-oxyl Catholytes for a High-Capacity and High Current Density Oxygen-Insensitive Hybrid-Flow Battery", ACS Energy Letters, 2(2):411-416.
Yin et al. (2018) "First Clear-Cut Experimental Evidence of a Glass Transition in a Polymer with Intrinsic Microporosity: PIM-1", Journal of Physical Chemistry Letters, 9(8):2003-2008.
Yuan et al. (2018) "Ion Conducting Membranes for Aqueous Flow Battery Systems", Chemical Communications, 54(55):7570-7588.
Yuan et al. (May 25, 2018) "Toward a Low-Cost Alkaline Zinc-Iron Flow Battery with a Polybenzimidazole Custom Membrane for Stationary Energy Storage", iScience, 3:40-49.
Li, et al. (2015) "Polysulfide-Blocking Microporous Polymer Membrane Tailored for Hybrid Li-Sulfur Flow Batteries," ACS Nano Lett., Supporting Information, 11 pages.
International Search Report and Written Opinion for Application No. PCT/US2023/70200, mailed on Dec. 13, 2023, 26 pages.
International Search Report and Written Opinion for Application No. PCT/US2023/70227, mailed on Jan. 24, 2024, 10 pages.
Lonchakova et al. (2020) "Efficient Gel-polymer Electrolyte for Sodium-ion Batteries Based on Poly(Acrylonitrile-co-methyl Acrylate)", Electrochimica Acta, 334:135512.
Budd et al., "Polymers of Intrinsic Microporosity (PIMs): High Free Volume Polymers for Membrane Applications," Macromolecular Symposia, 245(1):403-405, 2006.
Ghanem et al., "Polymers of Intrinsic Microporosity Derived from Bis(phenazyl) Monomers," Macromolecules, 41:1640-1646, 2008.
Ghanem et al., "Synthesis, Characterization, and Gas Permeation Properties of a Novel Group of Polymers with Intrinsic Microporosity: PIM-Polyimides," Macromolecules, 42:7881-7888, 2009.
Long et al., "Minimization of Free Volume Alignment of Triptycenes in Liquid Crystals and Stretched Polymers," Advanced Materials 13(8):601-604, 2001.
International Search Report and Written Opinion for International Patent Application No. PCT/US2023/75120, mailed Feb. 28, 2024.
International Search Report and Written Opinion for International Patent Application No. PCT/US2023/085432, mailed Apr. 23, 2024.
International Search Report and Written Opinion for International Patent Application No. PCT/US2024/35803, mailed Sep. 18, 2024.

\* cited by examiner

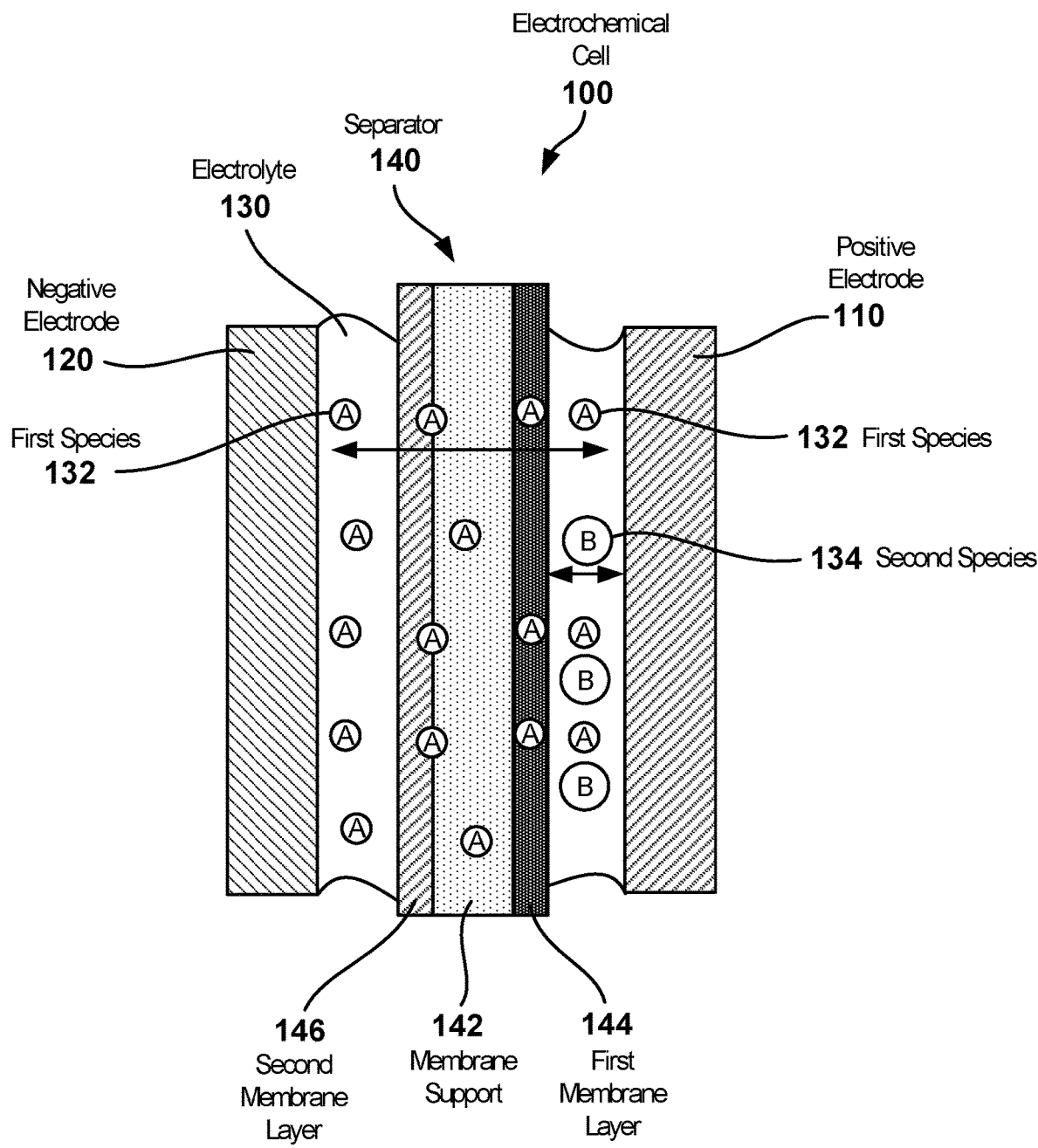

ELECTROCHEMICAL CELLS WITH IONIC SEQUESTRATION PROVIDED BY POROUS SEPARATORS

CROSS-REFERENCES TO RELATED APPLICATIONS

This application is a Continuation of U.S. patent application Ser. No. 16/335,219, filed Mar. 20, 2019, which is a U.S. National Phase of International Application No. PCT/US2017/054069, filed Sep. 28, 2017, which claims priority to U.S. Provisional Application No. 62/401,046, filed Sep. 28, 2016, which is incorporated in its entirety for all purposes.

BACKGROUND OF THE INVENTION

Rapid increases in popularity and availability of battery-powered devices, such as mobile electronics and electrical vehicles, are catalyzed by breakthroughs in battery technology. These breakthroughs have dramatically lowered the price of batteries, expanded material options, and opened doors for new applications and markets. For example, world-wide registration of new plug-in hybrid electric and battery-only electric vehicles (PHEV and BEV) have increased dramatically in recent years. Advancing energy and power density of batteries is critical to further expansion of this market. Extending operating life of batteries is another important aspect, particularly when operating under aggressive duty cycles common for mobile electronics and electrical vehicles.

Longevity of batteries has been a serious concern, particularly for electrical vehicles that utilize large and expensive batteries. Range reduction stemming from premature capacity fade is viewed as a major barrier for rapid growth of this market segment. Capacity fade and associated rising cell impedance has its origins in a mechanism associated with contamination of negative electrodes by transition metals released from positive electrodes. For example, in a typically lithium ion battery, these metals leach out of the positive electrode, migrate across the separator, and perturb the protective surface film on the negative electrode. This capacity fade is most severe when using manganese-rich materials, such as spinel and layered lithium manganese oxide (LMO) and high-voltage nickel manganese oxide (NMO), for positive electrodes. Other materials, such as nickel manganese cobalt oxide (NMC or NCM), lithium cobalt oxide (LCO), and lithium iron phosphate (LFP), are similarly susceptible to this fade mechanism. Conventional separators do not block the migration of transition metals to the negative electrode. New materials and methods are needed for protecting electrochemical cells from the capacity fade and, more generally, for preventing selected species from freely migrating from one electrode to another.

BRIEF SUMMARY OF THE INVENTION

Provided are electrochemical cells including separators permeable to some materials and impermeable to other materials in electrolytes. Also provided are methods of forming such separators. The selective permeability of a separator is achieved by its specific pore diameter and its narrow pore-size distribution around this diameter. Specifically, a species responsible for desirable ion transport in an electrochemical cell is allowed to pass through the separator, while another species is blocked thereby preventing degradation of the cell. For example, a species including alkali metal cations, such as lithium ions or sodium ions, is allowed to pass through the separator in rechargeable cells, while one or more species containing a transition metal are blocked. The membrane layer may be a standalone layer, supported by a membrane support, or supported by one of the electrodes.

In some embodiments, an electrochemical cell comprises a positive electrode, a negative electrode, a separator, and an electrolyte. The separator is disposed between the positive electrode and the negative electrode. The separator provides electronic isolation between the positive electrode and the negative electrode. The separator comprises a first membrane layer. The electrolyte comprising a first species and a second species. At least a portion of the electrolyte is disposed within the separator. The separator, with at least the portion of the electrolyte is disposed within the separator, is permeable to the first species providing ionic communication between the positive electrode and the negative electrode. The separator, with at least the portion of the electrolyte is disposed within the separator, is substantially impermeable to the second species comprising the element of the electrochemical active material of the positive electrode. The first species is selected from group consisting of $H^+$, $Li^+$, $Na^+$, $K^+$, $Rb^+$, $Cs^+$, $F^-$, $Cl^-$, $Br^-$, $I^-$, $BF_4^-$, $PF_6^-$, $AsF_6^-$, $ClO_4^-$, methanesulfonate, trifluoromethanesulfonate, tris(pentafluoroethyl)trifluorophosphate, bis(fluorosulfonyl)imide, cyclo-difluoromethane-1,1-bis(sulfonyl)imide, cyclo-hexafluoropropane-1,1-bis(sulfonyl)imide, bis(trifluoromethanesulfonylimide), bis(perfluoroethanesulfonyl)imide, bis(oxalate)borate, difluoro(oxalate)borate, bis(fluoromalonato)borate, tetracyanoborate, dicyanotriazolate, dicyano-trifuloromethyl-imidazolate, dicyano-pentafuoroethyl-imidazoleate, and ion pairs thereof. The second species comprises at least one of an atom, an ion, an ion pair, and a molecule comprising Be, Mg, Ca, Sr, Ba, Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, B, C, N, O, Al, Si, P, S, Ga, Ge, As, Se, In, Sn, Sb, Te, Tl, Pb, Bi, Po, La, Ce, Pr, Nd, Pm, Sm, Eu, Gd, Tb, Dy, Ho, Er, Tm, Yb, Ac, Th, Pa, U, methanesulfonate, trifluoromethanesulfonate, tris(pentafluoroethyl)trifluorophosphate, bis(fluorosulfonyl)imide, cyclo-difluoromethane-1,1-bis(sulfonyl)imide, cyclo-hexafluoropropane-1,1-bis(sulfonyl)imide, bis(trifluoromethanesulfonylimide), bis(perfluoroethanesulfonyl)imide, bis(oxalate)borate, difluoro(oxalate)borate, bis(fluoromalonato)borate, tetracyanoborate, dicyanotriazolate, dicyano-trifulorom-ethyl-imidazolate, dicyano-pentafuoroethyl-imidazoleate, acetylacetonate, acetylacetone, a β-ketoester of the formula $RC=OCH_2COOR'$, where R and R' are each independently $C_{1-6}$ alkyl, $C_{6-12}$ aryl, or $C_{1-6}$ alkoxy-$C_{1-6}$ alkyl or a combination of, and ion pairs thereof.

In some embodiments, the first membrane layer comprises a planar species and a linker having a site of contortion. The linker may be selected from the group consisting of a spiro group, a bridged ring moiety, and a sterically congested single covalent bond. The planar species may be represented by the following formula:

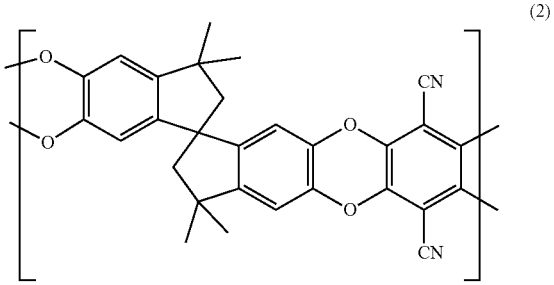

(2)

In some embodiments, the separator further comprises a membrane support laminated to the first membrane layer. The membrane support being permeable to the second species. The membrane support may be a porous polymer selected from the group consisting of polypropylene and polyethylene. The average pore diameter of the membrane support is at least about 10 nanometers. The first membrane layer may be disposed between the membrane support and the positive electrode.

In some embodiments, the separator further comprises a second membrane layer laminated to the membrane support. The membrane support may be disposed between the first membrane layer and the second membrane layer. The second membrane layer may be permeable to the first species providing ionic communication between the positive electrode and the negative electrode, and wherein the second membrane layer is substantially impermeable to the second species comprising the element of the electrochemical active material of the positive electrode. In some embodiments, the second membrane layer comprises a ceramic material selected from the group consisting of aluminum oxide, silicon oxide, silicon carbide, titanium dioxide, magnesium oxide, tin oxide, cerium oxide, ziconium oxide, barium titanite, yttrium oxide, boron nitride, and an ion conducting ceramic.

In some embodiments, the first membrane layer directly interfaces the negative electrode and the positive electrode.

These and other embodiments are described further below with reference to the figures.

BRIEF DESCRIPTION OF THE DRAWINGS

FIGS. 1A-1G are schematic representations of different examples of electrochemical cells having different configurations of separators. FIG. 1A describes an embodiment of the electrochemical cell with a separator (140) having a first membrane layer (144) laminated to a membrane support (142) on the positive electrode side of the membrane support, and a second membrane layer (146) laminated to the membrane support on the negative electrode side of the membrane support, with electrolyte (130) separating the negative electrode (120) and the second membrane layer (146), and separating the positive electrode (110) and the first membrane layer (144). FIG. 1B describes an embodiment of the electrochemical cell with a separator (140) having a first membrane layer (144) laminated to a membrane support (142) on the positive electrode side of the membrane support, with electrolyte (130) separating the negative electrode (120) and the membrane support (144), and separating the positive electrode (110) and the first membrane layer (144). FIG. 1C describes an embodiment of the electrochemical cell with a separator (140) having a first membrane layer (144), with electrolyte (130) separating the negative electrode (120) and the positive electrode (110) from the first membrane layer (144). FIG. 1D describes an embodiment of the electrochemical cell with a separator (140) having a first membrane layer (144) laminated to a membrane support (142) on the positive electrode side of the membrane support, and a second membrane layer (146) laminated to the first membrane layer (144) on the positive electrode side of the first membrane layer, with electrolyte (130) separating the negative electrode (120) and the membrane support (142), and separating the positive electrode (110) and the second membrane layer (146). FIG. 1E describes an embodiment of the electrochemical cell with a separator (140) having a second membrane layer (146) laminated to a membrane support (142) on the positive electrode side of the membrane support, and a first membrane layer (144) laminated to the second membrane layer (146) on the positive electrode side of the second membrane layer, with electrolyte (130) separating the negative electrode (120) and the membrane support (142), and separating the positive electrode (110) and the first membrane layer (144). FIG. 1F describes an embodiment of the electrochemical cell with a separator (140) having a first membrane layer (144) laminated to the positive electrode (110), and a membrane support (142), with electrolyte (130) separating the negative electrode (120) and the membrane support (142), and separating the first membrane layer (144) and the membrane support (142). FIG. 1G describes an embodiment of an electrochemical cell showing multiple layers of the positive electrode (110), negative electrode (120) and the separator (140).

FIG. 2A illustrates one example of pore size distribution 202 for membrane layer 144. FIG. 2B illustrates the electrochemical stability of the electrochemical cells of the present invention. FIG. 2C illustrates results permeability of Mn across the hybrid separator of the present invention. FIG. 2D illustrates electrochemical impedance spectroscopy for the hybrid separator of the present invention. FIG. 2E shows a close-up of the high frequency region of FIG. 2D.

DETAILED DESCRIPTION OF THE INVENTION

Figure 1B:
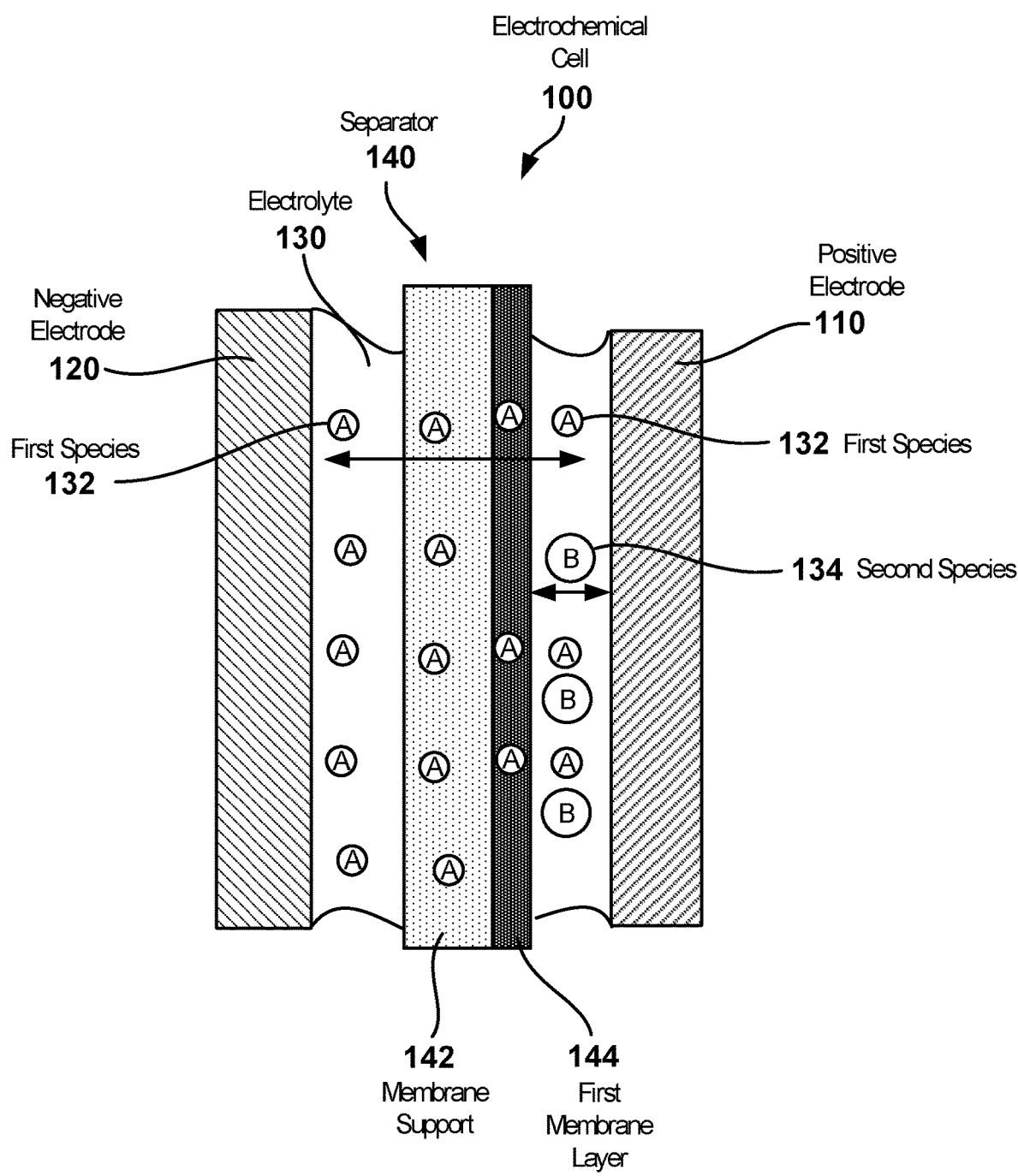

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

I. GENERAL

Migration of undesirable species in electrochemical cells may cause various deleterious effects, such as a capacity fade, a voltage fade, or a rise in cell impedance. For example, in many lithium ion batteries, the migration of even small amounts of certain metal ions (other than lithium ions used to balance the electrical current) to negative electrodes causes substantial increase in cell resistance and accelerates capacity fade. At the same time, many positive electrode active materials used in lithium ion batteries include various metals, such as cobalt, tin, manganese, iron, titanium, nickel, aluminum, zirconium, chromium, vanadium, gallium, zinc, and copper that may deleteriously affect the performance of the electrochemical cell. Similarly, in electrochemical capacitors, electrochemical pseudocapacitors, electrochromics, electrocatalytic devices, and photoelectrochemical devices employing transition metal-containing, main group semi-metal-containing, lanthanide-containing, or actinide-containing electrode materials, the complete or partial dissolution of those active materials in the device due to ageing, corrosion, hydrolysis, or other chemical degradation (be it chemical, photochemical, electrochemical, or photoelectrochemical in nature, or a combination thereof) results in performance loss of a similar nature. It is thought that preventing these metals and, more generally, undesirable species from migrating from one electrode to another electrode are viable and more cost-effective alternatives than changing composition of electrodes or other approaches. Migration control may be achieved using a separator that is permeable to one species (e.g., alkali metal cations including lithium, sodium or potassium ions and alkaline earth metal cations including magnesium ions or calcium ions) and not permeable to other species (e.g., transition metals, main group semi-metals, lanthanides, or actinides). Migration control is also important in electrolytic devices where one species (e.g., transition metals) is plated on an electrode while another species (e.g., water) serves as a sacrificial reagent and is oxidized on the other electrode, where it is desirable to prevent the one species from reaching the positive electrode.

Various prior approaches to migration control such as electrolyte additives, inorganic electrode coatings, and separators capable of chelating ions, have been tried but have also been proved to be ineffective. For example, trade-offs persist when using electrolyte additives or electrode coatings with respect to their ability to impart long-term stability and fast transport of desirable species (e.g., lithium ions or sodium ions). On the other hand, for chelating separators, transport of desirable species through the separator is almost always impeded. These separators also exhibit a finite and therefore limited binding capacity for transition metals. It may also be the case that cathode dissolution is accelerated by the separator's active chemisorption of dissolved transition metals.

Provided are electrochemical cells having separators with controlled pore diameter. Specifically, the pore diameter is selected in such a way that the separator is permeable to a first species and substantially impermeable to a second species, which is larger in size than the first species either solvated in electrolyte or desolvated. For purposes of this disclosure, the term "permeable" is defined as having a diffusion coefficient through the separator that is >0.1 times the diffusion coefficient in bulk electrolyte or in some embodiments >0.01 times the diffusion coefficient in bulk electrolyte or more specifically >0.001 times the diffusion coefficient in bulk electrolyte. The term "substantially impermeable" is defined as having a diffusion coefficient through the separator that is <0.1 times the diffusion coefficient in bulk electrolyte or in some embodiments <0.01 times the diffusion coefficient in bulk electrolyte or more specifically <0.001 times the diffusion coefficient in bulk electrolyte. In all cases, the permeable species have a larger diffusion coefficient through the separator than that of the substantially impermeable species.

For example, a separator may permanently sequester transition metal complexes supplied from the positive electrode and dissolved in the electrolyte. At the same time, the separator can maintain high ionic conductivity for solvated lithium or sodium ions. As such, the separator exploits the difference in size between two different species, such as transition metal complexes and alkali metal ions to achieve transport selectivity or specificity. This size-sieving transport selectivity or specificity is applicable to atoms, molecules, ions, and coordination complexes.

II. DEFINITIONS

"Electrode" refers to an electrically conductive material in a circuit that is in contact with a nonmetallic part of the circuit, such as the electrolyte. The electrode can be a positive electrode or cathode, the electrode where reduction occurs. The electrode can be a negative electrode or anode, the electrode where oxidation occurs.

"Electrolyte" refers to a solution of the electrochemical cell that includes ions, such as metal ions and protons as well as anions, that provides ionic communication between the positive and negative electrodes.

"Separator" refers to an electrically insulating membrane between the positive and negative electrodes to prevent electrical shorts, i.e., provides electronic isolation. The separator also allows the ions to move between the positive and anode electrodes. The separator can include any suitable polymeric material that is electrically insulating and porous. The separator can include several layers including one or more membrane layers, and a membrane support material for the membrane layers.

"Membrane layer" refers to a layer of the separator that is permeable to a first species of the electrolyte while substantially impermeable to a second species of the electrolyte. The membrane layer can be of any suitable material that can provide the selective permeability, such a polymers of intrinsic microporosity. "Substantially impermeable" refers to less than 10% of the second species passing through the membrane layer, or less than 1%, or less than 0.1%, or less than 0.01%, or less than 0.001% of the second species passing through the membrane layer.

"Oxide" refers to a chemical compound having an oxygen, such as metal oxides or molecular oxides.

"Pore size" or "pore diameter" refers to the average diameter of interstitial space not occupied by the pore forming material. This may include, but is not limited to, the space remaining between polymer chains due to inefficient packing, the space remaining between organic linkers and metal ions in a metal-organic framework, the space between layers and within the holes of stacked 2D material, and the space left in an amorphous or semi-crystalline carbon due to unaligned covalent bonding. The pore size may also change once wetted with electrolyte or it may stay the same.

"Surface area" refers to the surface area of a porous material as measured by a variety of methods, such as nitrogen adsorption BET.

"Polymer of intrinsic microporosity" or "PIM" refers to an amorphous glassy polymer having interconnected pores with an average diameter of less than 10 nm, or less than 5, 4, 3, 2, or less than 1 nm.

"Microporosity" refer to a layer of the membrane comprising pores of less than or equal to 2 nm in size.

"Intrinsic microporosity" is used herein to mean the network polymer provides a continuous network of interconnected intermolecular voids (suitably of less than or equal to 2 nm in size), which forms as a direct consequence of the shape and rigidity (or concavity) of at least a proportion of the component monomers of the network polymer. As will be appreciated by a person skilled in the art, intrinsic microporosity arises due to the structure of the monomers used to form the network polymer and, as the term suggests, it is an intrinsic property of a network polymer formed from such monomers. The shape and rigidity of the monomer used to form the network polymer means that polymer possesses an internal molecular free volume (IMFV), which is a measure of the concavity of the monomers and is the difference between the volume of the concave monomer unity compared to that of the corresponding planar shape.

It is understood that the network polymers disclosed herein have a certain property (i.e. intrinsic microporosity). Disclosed herein are certain structural requirements in the monomers used for giving a polymer performing the disclosed function, and it is understood that there are a variety of structures that can perform the same function that are related to the disclosed monomer structures, and that these structures will typically achieve the same result.

"Metal" refers to elements of the periodic table that are metallic and that can be neutral, or negatively or positively charged as a result of having more or fewer electrons in the valence shell than is present for the neutral metallic element. Metals useful in the present invention include the alkali metals, alkali earth metals, transition metals and post-transition metals. Alkali metals include Li, Na, K, Rb and Cs. Alkaline earth metals include Be, Mg, Ca, Sr and Ba. Transition metals include Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg and Ac. Post-transition metals include Al, Ga, In, Tl, Ge, Sn, Pb, Sb, Bi, and Po. Rare earth metals include Sc, Y, La, Ce, Pr, Nd, Sm, Eu, Gd, Tb, Dy, Ho, Er, Tm, Yb and Lu. One of skill in the art will appreciate that the metals described above can each adopt several different oxidation states, all of which are useful in the present invention. In some instances, the most stable oxidation state is formed, but other oxidation states are useful in the present invention.

"Semi-metal" refers to elements of the periodic table having a small overlap between the bottom of the conduction band and the top of the valence band, and includes elements As, Sb, Bi, and Sn. One of skill in the art will appreciate that the semi-metals described above can each adopt several different oxidation states, all of which are useful in the present invention. In some instances, the most stable oxidation state is formed, but other oxidation states are useful in the present invention.

"Metalloids" refers to elements of the periodic table having properties between that of metals and non-metals, and includes at least elements B, Si, Ge, As, Sb and Te. One of skill in the art will appreciate that the some metalloids described above can each adopt several different oxidation states, all of which are useful in the present invention. In some instances, the most stable oxidation state is formed, but other oxidation states are useful in the present invention.

"Ligand" refers to an ion or functional group that binds to a metal ion forming a coordination complex that stabilizes the metal ion. Ligands can include oxides, sulfides, selenides, halides, nitrate, azide, hydroxide, oxalate, nitrite, thiocyante, isothiocyanate, acetnitrite, pyridine, ammonia, ethylenediamine, 2,2'-bipyridine, triphenylphosphine, cyanide, carbon dioxide, acetylacetonate (acac), alkenes, BAPTA, benzene, or 1,2-bis(diphenylphosphino) ethane (dppe). Other ligands are known to one of skill in the art.

"Membrane support" refers to any suitable material that is capable of supporting the membrane layer of the present invention, and is permeable to the first species and second species.

"Laminated" refers to the deposition of one layer on another, such as the membrane layer on the membrane support.

"Alkyl" refers to a straight or branched, saturated, aliphatic radical having the number of carbon atoms indicated. Alkyl can include any number of carbons, such as $C_{1-2}$, $C_{1-3}$, $C_{1-4}$, $C_{1-5}$, $C_{1-6}$, $C_{1-7}$, $C_{1-8}$, $C_{1-9}$, $C_{1-10}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. For example, $C_{1-6}$ alkyl includes, but is not limited to, methyl, ethyl, propyl, isopropyl, butyl, isobutyl, sec-butyl, tert-butyl, pentyl, isopentyl, hexyl, etc. Alkyl can also refer to alkyl groups having up to 20 carbons atoms, such as, but not limited to heptyl, octyl, nonyl, decyl, etc. Alkyl groups can be substituted or unsubstituted.

"Alkoxy" or "alkyl ether" refers to an alkyl group having an oxygen atom that connects the alkyl group to the point of attachment: alkyl-O—. As for alkyl group, alkoxy groups can have any suitable number of carbon atoms, such as $C_{1-6}$. Alkoxy groups include, for example, methoxy, ethoxy, propoxy, iso-propoxy, butoxy, 2-butoxy, iso-butoxy, sec-butoxy, tert-butoxy, pentoxy, hexoxy, etc. The alkoxy groups can be further substituted with a variety of substituents described within. Alkoxy groups can be substituted or unsubstituted.

"Alkyl-alkoxy" refers to a radical having an alkyl component and an alkoxy component, where the alkyl component links the alkoxy component to the point of attachment. The alkyl component is as defined above, except that the alkyl component is at least divalent, an alkylene, to link to the alkoxy component and to the point of attachment. The alkyl component can include any number of carbons, such as $C_{0-6}$, $C_{1-2}$, $C_{1-3}$, $C_{1-4}$, $C_{1-5}$, $C_{1-6}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. In some instances, the alkyl component can be absent. The alkoxy component is as defined above. Examples of the alkyl-alkoxy group include, but are not limited to, 2-ethoxy-ethyl and methoxymethyl.

"Halogen" refers to fluorine, chlorine, bromine and iodine.

"Haloalkyl" refers to alkyl, as defined above, where some or all of the hydrogen atoms are replaced with halogen atoms. As for alkyl group, haloalkyl groups can have any suitable number of carbon atoms, such as $C_{1-6}$. For example, haloalkyl includes trifluoromethyl, flouromethyl, etc. In some instances, the term "perfluoro" can be used to define a compound or radical where all the hydrogens are replaced with fluorine. For example, perfluoromethyl refers to 1,1,1-trifluoromethyl.

"Haloalkoxy" refers to an alkoxy group where some or all of the hydrogen atoms are substituted with halogen atoms. As for an alkyl group, haloalkoxy groups can have any suitable number of carbon atoms, such as $C_{1-6}$. The alkoxy groups can be substituted with 1, 2, 3, or more halogens. When all the hydrogens are replaced with a halogen, for example by fluorine, the compounds are per-substituted, for example, perfluorinated. Haloalkoxy includes, but is not limited to, trifluoromethoxy, 2,2,2,-trifluoroethoxy, perfluoroethoxy, etc.

"Aryl" refers to an aromatic ring system having any suitable number of ring atoms and any suitable number of rings. Aryl groups can include any suitable number of ring atoms, such as, 6, 7, 8, 9, 10, 11, 12, 13, 14, 15 or 16 ring atoms, as well as from 6 to 10, 6 to 12, or 6 to 14 ring members. Aryl groups can be monocyclic, fused to form bicyclic or tricyclic groups, or linked by a bond to form a biaryl group. Representative aryl groups include phenyl, naphthyl and biphenyl. Other aryl groups include benzyl, having a methylene linking group. Some aryl groups have from 6 to 12 ring members, such as phenyl, naphthyl or biphenyl. Other aryl groups have from 6 to 10 ring members, such as phenyl or naphthyl. Some other aryl groups have 6 ring members, such as phenyl. Aryl groups can be substituted or unsubstituted.

"Aryl ether" or "aryloxy" refers to an aryl group, as defined above, linked via an oxygen atom to the remainder of the molecule.

The groups defined above can optionally be substituted by any suitable number and type of substituents. Representative substituents include, but are not limited to, halogen, haloalkyl, haloalkoxy, —OR', =O, —OC(O)R', —(O)R', —O$_2$R', —ONR'R", —OC(O)NR'R", =NR', =N—OR', —NR'R"', —NR"C(O)R', —NR'—(O)NR"R"', —NR"C(O)OR', —NH—(NH$_2$)=NH, —NR'C(NH$_2$)=NH, —NH—(NH$_2$)=NR', —SR', —S(O)R', —S(O)$_2$R', —S(O)$_2$NR'R", —NR'S(O)$_2$R", —N$_3$ and —NO$_2$. R', R" and R"' each independently refer to hydrogen, unsubstituted alkyl, such as unsubstituted $C_{1-6}$ alkyl. Alternatively, R' and R", or R" and R"', when attached to the same nitrogen, are combined with the nitrogen to which they are attached to form a heterocycloalkyl or heteroaryl ring, as defined above.

III. ELECTROCHEMICAL CELLS WITH HYBRID SEPARATOR

In some embodiments, an electrochemical cell comprises a positive electrode, a negative electrode, a separator, and an electrolyte. The separator is disposed between the positive electrode and the negative electrode. The separator provides electronic isolation between the positive electrode and the negative electrode. The separator comprises a first membrane layer. The electrolyte comprising a first species and a second species. At least a portion of the electrolyte is disposed within the separator. The separator, with at least the portion of the electrolyte is disposed within the separator, is permeable to the first species providing ionic communication between the positive electrode and the negative electrode. The separator, with at least the portion of the electrolyte is disposed within the separator, is substantially impermeable to the second species comprising the element of the electrochemical active material of the positive electrode. The first species is selected from group consisting of $H^+$, $Li^+$, $Na^+$, $K^+$, $Rb^+$, $Cs^+$, $F^-$, $Cl^-$, $Br^-$, $I^-$, $BF_4^-$, $PF_6^-$, $AsF_6^-$, $ClO_4^-$, methanesulfonate, trifluoromethanesulfonate, tris(pentafluoroethyl)trifluorophosphate, bis(fluorosulfonyl)imide, cyclo-difluoromethane-1,1-bis(sulfonyl)imide, cyclo-hexafluoropropane-1,1-bis(sulfonyl)imide, bis(trifluoromethanesulfonylimide), bis(perfluoroethanesulfonyl)imide, bis(oxalate)borate, difluoro(oxalate)borate, bis(fluoromalonato)borate, tetracyanoborate, dicyanotriazolate, dicyano-trifuloromethyl-imidazolate, dicyano-pentafuoroethyl-imidazoleate, and ion pairs thereof. The second species comprises at least one of an atom, an ion, an ion pair, and a molecule comprising Be, Mg, Ca, Sr, Ba, Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, B, C, N, O, Al, Si, P, S, Ga, Ge, As, Se, In, Sn, Sb, Te, Tl, Pb, Bi, Po, La, Ce, Pr, Nd, Pm, Sm, Eu, Gd, Tb, Dy, Ho, Er, Tm, Yb, Ac, Th, Pa, U, methanesulfonate, trifluoromethanesulfonate, tris (pentafluoroethyl)trifluorophosphate, bis(fluorosulfonyl)imide, cyclo-difluoromethane-1,1-bis(sulfonyl)imide, cyclo-hexafluoropropane-1,1-bis(sulfonyl)imide, bis (trifluoromethanesulfonylimide), bis (perfluoroethanesulfonyl)imide, bis(oxalate)borate, difluoro (oxalate)borate, bis(fluoromalonato)borate, tetracyanoborate, dicyanotriazolate, dicyano-trifuloromethyl-imidazolate, dicyano-pentafuoroethyl-imidazoleate, acetylacetonate, acetylacetone, a β-ketoester of the formula RC=OCH$_2$COOR', where R and R' are each independently $C_{1-6}$ alkyl, $C_{6-12}$ aryl, or $C_{1-6}$ alkoxy-$C_{1-6}$ alkyl or a combination of, and ion pairs thereof.

In some embodiments, the electrochemical cell of the present invention includes a positive electrode and a negative electrode. The electrochemical call also includes a separator disposed between the positive electrode and the negative electrode, wherein the separator provides electronic isolation between the positive electrode and the negative electrode, wherein the separator comprises a first membrane layer. The electrochemical cell also includes an electrolyte comprising a first species and a second species, wherein the first species is an ion having a charge of +1 or −1, wherein the second species comprises a metal ion having a charge of at least +1, wherein the first and second species are different, and wherein the electrolyte is in electrical contact with both the positive and negative electrodes. The first membrane layer of the electrochemical cell is permeable to the first species and substantially impermeable to the second species.

The electrochemical cells of the present invention have several advantages over those known in the art. For example, the electrochemical cells having a membrane layer can have a lower overpotential in variable rate cycling of full cells compared to a separator without a membrane layer. Moreover, the electrochemical cells having a membrane layer can have more cycles before 80% of the original capacity is reached over long-term cycling of full cells compared to a separator without a membrane layer. The electrochemical cells of the present invention provide other advantages as described within.

FIG. 1 is a schematic illustration of electrochemical cell 100, in accordance with some embodiments. Electrochemical cell 100 comprises positive electrode 110, negative electrode 120, and electrolyte 130 providing an ionic transport between positive electrode 110 and negative electrode 120. Electrochemical cell 100 also comprises separator 140 disposed between positive electrode 110 and negative electrode 120. Separator 140 disposed may be in direct physical contact with positive electrode 110 and/or negative electrode 120 (e.g., forming a jellyroll or a stack), with electrolyte 130 filling pores in separator 140. Electrolyte 130 may also fill pores in positive electrode 110 and negative electrode 120 when electrolyte 130 is a liquid one. When electrolyte 130 is solid it stays in pores of separator 140.

A. Electrodes

Positive electrode 110 may include a positive electrochemically active material some examples of which include, but are not limited to, Li $(M'_xM''_y)O_2$, where M' and M'' are different metals (e.g., $Li(Ni_xMn_y)O_2$, $Li(Ni_{1/2}Mn_{1/2})O_2$, $Li(Cr_xMn_{1-x})O_2$, $Li(Al_xMn_{1-x})O_2$), $Li(Co_xM_{1-x})O_2$, where M is a metal, (e.g., $Li(Co_xNi_{1-x})O_2$ and $Li(Co_xFe_{1-x})O_2$), $Li_{1-W}(Mn_xNi_yCo_Z)O_2$, (e.g., $Li(Co_xMn_yNi_{(1-x-y)})O_2$, $Li(Mn_{1/3}Ni_{1/3}Co_{1/3})O_2$, $Li(Mn_{1/3}Ni_{1/3}Co_{1/3}\text{-}xMg_x)O_2$, $Li(Mn_{0.4}Ni_{0.4}Co_{0.2})O_2$, $Li(Mn_{0.1}Ni_{0.8}Co_{0.1})O_2,)$ $Li_{1-W}(Mn_xNi_xCo_{1-2x})O_2$, $Li_{1-W}(Mn_xNi_yCoAl_W)O_2$, $Li_{1-W}(Ni_xCo_yAl_Z)O_2$ (e.g., $Li(Ni_{0.8}Co_{0.15}Al_{0.05})O_2$), $Li_{1-W}(Ni_xCo_yM_Z)O_2$, where M is a metal, $Li_{1-W}(Ni_xMn_yM_Z)O_2$, where M is a metal, $Li(Ni_{X-Y}Mn_YCr_{2-X})O_4$, $LiM'M''_2O_4$, where M' and M'' are different metals (e.g., $LiMn_{2-Y-Z}Ni_YO_4$, $LiMn_{2-Y-Z}Ni_YLi_ZO_4$, $LiMn_{1.5}Ni_{0.5}O_4$, $xLi_2MnO_3 \cdot (1-x)LiMO_2$, where M is a metal, $xLi_2MnO_3 \cdot (1-x)LiM_2O_4$, where M is a metal, $LiNiCuO_4$, $LiMn_{1-x}Al_xO_4$, $LiNi_{0.5}Ti_{0.5}O_4$, $Li_{1.05}Al_{0.1}Mn_{1.85}O_{4-z}F_z$, $Li_2MnO_3$) $Li_xV_yO_z$, e.g., $LiV_3O_8$, $LiV_2O_8$, and $LiV_6O_{13}$, $LiMPO_4$ where M is a metal (e.g., $LiFePO_4$ $LiFe_xM_{1-x}PO_4$, where M is a metal), $LiVOPO_4$, $Li_3V_2(PO_4)_3$, and $LiMPO_4$. In general, the selection of a positive active material depends on several considerations, such as cell capacity, safety requirements, intended cycle life, etc. Lithium cobalt oxide (LiCoO$_2$) may be used in smaller cells that require higher gravimetric and/or volumetric capacities, such as portable electronics and medical devices. Cobalt may be partially substituted with Sn, Mg, Fe, Ti, Al, Zr, Cr, V, Ga, Zn, or Cu. Certain materials, such as lithium nickel oxide (LiNiO$_2$), may be less prone to thermal runaway. Other materials provide substantial cost advantage, such as lithium manganese oxide (LiMnO$_2$ or LiMn$_2$O$_4$ spinel). Furthermore, lithium manganese oxide has a relatively high power density because its three-dimensional crystalline structure provides more surface area, thereby permitting more ion flux between the electrodes. High-energy density lithium-rich layered oxides such as manganese-oxide composite electrodes may also be utilized where a layered Li$_2$MnO$_3$ component is integrated with a layered LiMO$_2$, where M is a metal, or spinel LiM$_2$O$_4$, where M is a metal.

Negative electrode 120 may include a negative electrochemically active material some examples of which include, but are not limited to carbon (e.g., in the form of graphite), lithium titanate (e.g., for high-power apps), silicon, silicon oxides (e.g., SiO and SiO$_2$), tin, germanium, various combinations of silicon and/or tin with carbon (e.g., blends of Si (and/or SiO) and Sn with graphite), sodium metal, lithium metal, and manganese. One having ordinary skills in the art would understand that some of these negative materials are more susceptible to degradation if second species 134 cross through separator 140 and contaminate negative electrode 120. For example, transition metals are highly undesirable contaminants of negative electrodes 120 that include carbon (e.g., graphite electrodes).

B. Separators

Separator 140 may include at least one membrane layer, such as first membrane layer 144 shown in FIG. 1A. First membrane layer 144 may define permeability characteristics of separator. For example, first membrane layer 144 and separator 140 may be permeable to first species 132 and substantially impermeable or completely impermeable to second species 134.

As shown in FIG. 1A, first membrane layer 144 may be laminated to membrane support 142, which may be made from a different material and/or have different characteristics than first membrane layer 144. For example, membrane support 142 may be permeable to second species 134 because the pore size of membrane support 142 is much greater than that of first membrane layer 144 (e.g., at least 3 times greater, at least 5 times greater, or at least 10 times greater, or at least 100 times greater, or at least even 200 times greater). However, because first membrane layer 144 is substantially impermeable to second species 134, then separator 140 is also impermeable to second species 134.

Membrane Support

In some embodiments, the pore size of membrane support 142 is between about 0.01 micrometers and 5 micrometers or more specifically between about 0.02 micrometers and 0.5 micrometers. The porosity of membrane support 142 may be between about 20% and 85%, or more specifically, between about 30% and 60%. One having ordinary skills in the art would understand that pore sizes may be effected by the composition of electrolyte 130 that is provided in the pores of separator. For example, some components of separator 140 (e.g., membrane support 142 or first membrane layer 144) may swell when come in contact with some materials of electrolyte 130 causing the pore size to change. Unless specifically noted, the pore size and other like parameter refer to components of separator 140 before they come in contact with electrolyte 130.

Larger pore sizes allow using membrane support 142 that is much thicker than first membrane layer 144 without significantly undermining the overall permeability of separator to first species 132. In some embodiments, the thickness of membrane support 142 is between about 5 micrometers and 500 micrometers, or in specific embodiment between about 5 micrometers and 50 micrometers, or more specifically between about 10 micrometers and 30 micrometers. In the same or other embodiments, the thickness of membrane support 142 may be between about 1 to 50 times greater than the thickness of first membrane layer 144 or, more specifically, between about 5 and 25 times greater.

Some examples of suitable materials for membrane support 142 include, but are not limited, fluoro-polymeric fibers of poly(ethylene-co-tetrafluoroethylene (PETFE) and poly (ethylenechloro-co-trifluoroethylene) (e.g., a fabric woven from these used either by itself or laminated with a fluoropolymeric microporous film), polyvinylidene difluoride, polytetrafluoroethylene (PTFE), polystyrenes, polyarylether sulfones, polyvinyl chlorides, polypropylene, polyethylene (including LDPE, LLDPE, HDPE, and ultrahigh molecular weight polyethylene), polyamides, polyimides, polyacrylics, polyacetals, polycarbonates, polyesters, polyetherimides, polyimides, polyketones, polyphenylene ethers, polyphenylene sulfides, polymethylpentene, polysulfones non-woven glass, glass fiber materials, ceramics, metal oxides, composites of organic and inorganic species, and a polypropylene membrane. Membrane support 142 may also be supplied with an additional coating of a second suitable material including, but not limited to, PTFV, PVDF, and PETFE. These examples of membrane support 142 may or may not be commercially available under the designation CELGARD from Celanese Plastic Company, Inc. in Charlotte, N.C., USA, as well as Asahi Kasei Chemical Industry Co. in Tokyo, Japan, Tonen Corporation, in Tokyo, Japan, Ube Industries in Tokyo, Japan, Nitto Denko K.K. in Osaka, Japan. Nippon Kodoshi Corporation, in Kochi, Japan, Entek in Lebanon, Oregon, USA, SK Innovation in Jongro-Gu, Korea, Sumitomo Corporation, in Tokyo, Japan, Toray Industries in Tokyo, Japan, Dupont USA, in Wilmington, DE, USA, and Parker Hannifin Filtration Group, in Carson, CA, USA.

Membrane support 142 may have various features, such as thermal shutdown, high temperature dimensional stability, and oxidative stability which may not be available from first membrane layer 144.

The membrane support (element 140) may have a thickness of between about 3 micrometers and 200 micrometers, or between about 5 micrometers and 100 micrometers, or between about 10 micrometers and 50 micrometers, or more specifically between about 15 micrometers and 30 micrometers.

Membrane Layers

Selective blocking characteristics of one or more membrane layers used in a separator come from specific pore architectures of these layers. For purposes of this disclosure, the term "blocking" is referred to as sieving, selecting, or excluding. In some embodiments, the pore architectures of membrane layer manifest as networks of interconnected pores with small pore sizes, narrow pore-size distribution, high surface area, and high porosity as further described below. In other embodiments, the pore architectures of membrane layer manifest as an array of channels with small pore sizes, narrow pore-size distribution, high surface area, and high porosity as further described below. In addition to these blocking properties, the membrane layer possesses various other properties making them suitable for electrochemical cell applications, such as chemical and electrochemical stability, wettability, thickness, thermal stability, and the like.

The blocking mechanism is based on a size-exclusion effect transpired at a nanometer to sub-nanometer scale where tortuous, but electrolyte swollen and ionically percolating, pathways are established in membrane layers. For example, a membrane layer may allow solvated $LiPF_6$ species (or other like species described below) to pass while blocking larger transition metal complexes or the like. The membrane may be formed from a ladder polymer with angular spiro centers and absence of rotatable bonds in the polymer backbone or bonds in the backbone with restricted bond rotation. These characteristics provide inefficient solid-state packing with porosity of between about 10% and 40% or, more specifically, between about 20% and 30% of the bulk powder.

To achieve very high permeabilities, high free volume and microporosity are sought after. Polymers presenting these properties are so-called high free volume polymers. These highly permeable polymers have been applied mostly to gas separations. Some examples include certain substituted polyacetylenes (e.g. PTMSP), some perfluoropolymers (e.g. Teflon AF), certain poly(norbornene)s, polymers of intrinsic microporosity, and some polyimides. Their microporosity has been demonstrated by molecular modelling and positron lifetime spectroscopy (PALS). Highly permeable polyacetylenes have bulky side groups that inhibit conformational change and force the backbone into a twisted shape. These rigid polymer macromolecules cannot pack properly in the solid state, resulting in high free volume. The free volume distribution comprises disconnected elements as in glassy polymers and continuous microvoids. In Teflon perfluoropolymers their high free volume is due to a high barrier to rotation between neighbouring dioxolane rings, coupled with weak interchain interactions, which are well known for fluoropolymers, leading to low packing density and hence high permeability. In the case of poly(norborene)s and PTMSP, the presence of bulky trimethylsilyl groups on the ring greatly restricts the freedom of the polymer to undergo conformational change. In polymers of intrinsic microporosity (PIMs), molecular linkers containing points of contortion are held in non-coplanar orientation by rigid molecules, which do not allow the resulting polymers to pack closely and ensure high microporosity. The PIMs concept has been reported for polymides [P M Budd and N B McKewon, "Highly permeable polymers for gas separation membranes, Polymer Chemistry, 1, 63-68, 2010].

There are two different types of PIMs, i) non-network (linear) polymers which may be soluble in organic solvents, and ii) network polymers which are generally insoluble, depending on the monomer choice. PIMs possess internal molecular free volume (IMFV), which is a measure of concavity and is defined by Swager as the difference in volume of the concave unit as compared to the non-concave shape [T M Long and T M Swager, "Minimization of Free Volume: Alignment of Triptycenes in Liquid Crystals and Stretched Polymers", Adv. Mater, 13, 8, 601-604, 2001]. While the intrinsic microporosity in linear PIMs is claimed to derive from the impenetrable concavities given by their contorted structures, in network PIMs, microporosity is also claimed to derive from the concavities associated with macrocycles. In non-network PIMs, rotation of single bonds has to be avoided, whereas the branching and crosslinking in network PIMs is thought to avoid structural rearrangement that may result in the loss of microporosity (McKeown, 2010), so that single bonds can be present without loss of microporosity. In general, it has been observed that network PIMs possess greater microporosity than non-network PIMs due to their macrocyclization [N B McKewon, P M Budd, "Exploation of Intrinsic Microporosity in Polymer-Based materials", Macromolecules, 43, 5163-5176, 2010]. However, since prior art network PIMs are not soluble, they can only be incorporated into a membrane if mixed as fillers with microporous soluble materials, which include soluble PIMs or other soluble polymers. There is a strict requirement in non-network PIMs that there are no single bonds in the polymer backbone, to prevent rotational freedom and so provide intrinsic microporosity. Highly rigid and contorted molecular structures are required, providing awkward macromolecular shapes that cannot pack efficiently in space. Molecules with awkward shapes are those that pose packing problems due to their concavities. However, in order to have microporosity in non-network PIMs, concave shape molecules are not sufficient as the voids must be sufficiently interconnected for transport to occur with minimal energy (i.e. intrinsic microporosity) [N B McKewon, P M Budd, "Exploation of Intrinsic Microporosity in Polymer-Based materials", Macromolecules, 43, 5163-5176, 2010]. Non-network PIMs may be soluble, and so suitable for casting a membrane by phase inversion, or for use coating a support membrane to make a thin film composite. However, their solubility in a range of solvents restricts their applications in organic solvent nanofiltration [Ulbricht M, Advanced functional polymer membranes. Single Chain Polymers, 47, 2217-2262, 2006].

U.S. Pat. No. 7,690,514 B2 describes materials of intrinsic microporosity comprising organic macromolecules comprised of a first generally planar species connected by linkers having a point of contortion such that two adjacent first planar species connected by a linker are held in non-coplanar orientation. Preferred points of contortion are spiro groups, bridged ring moieties and sterically congested bonds around which there is restricted rotation. These non-network PIMs may be soluble in common organic solvents, allowing them to be cast into membranes, or coated onto other support membranes to make a thin film composite.

PIM-1 (soluble PIM) membranes exhibit gas permeabilities which are exceeded only by very high free volume polymers such as Teflon AF2400 and PTMSP, presenting selectivities above Robenson's 1991 upper bound for gas pairs such as $CO_2/CH_4$ and $O_2/N_2$. Studies have shown that permeability is enhanced by methanol treatment, helping flush out residual casting solvent and allowing relaxation of the chains [P M Budd and N B McKewon, D Fritsch, "Polymers of Intrinsic Microporosity (PIMs): High free volume polymers for membrane applications", Macromol Symp, 245-246, 403-405, 2006].

A range of polyimides with characteristics similar to a polymer of intrinsic microporosity (PIM) were prepared by Ghanem et al. and membrane gas permeation experiments showed these PIM-Polyimides to be among the most permeable of all polyimides and to have selectivities close to the upper bound for several important gas pairs [B G Ghanem, N B McKeown, P M Budd, N M Al-Harbi, D Fritsch, K Heinrich, L Starannikova, A Tokarev and Y Yampolskii, "Synthesis, characterization, and gas permeation properties of a novel group of polymers with intrinsic micro porosity: PIM-polyimides", Macromolecules, 42, 7781-7888, 2009].

U.S. Pat. No. 7,410,525 B1, describes polymer/polymer mixed matrix membranes incorporating soluble polymers of intrinsic microporosity as microporous fillers for use in gas separation applications.

International Patent Publication No. WO 2005/113121 (PCT/GB2005/002028) describes the formation of thin film composite membranes from PIMs by coating a solution of PIMs in organic solvent onto a support membrane, and then optionally crosslinking this PIM film to enhance its stability in organic solvents.

In order to improve the stability of soluble-PIMs membranes U.S. Pat. No. 7,758,751 B1, describes high performance UV-crosslinked membranes from polymers of intrinsic microporosity (PIMs) and their use in both gas separations, and liquid separations involving organic solvents such as olefin/paraffin, deep desulfurization of gasoline and diesel fuels, and ethanol/water separations.

In some embodiments, a membrane layer comprises a polymer having a chain comprised of repeating units bonded to each other. Each unit may include a first generally planar species comprising at least one aromatic ring and also comprising a rigid linker having a site of contortion, which is a spiro group, a bridged ring moiety, or a sterically congested single covalent bond. The rigid linker restricts rotation of the first planar species in a non-coplanar orientation. In some embodiments, at least 50% by mole (or 70%, 80%, or even 90%) of the first planar species in the chain are connected by the rigid linkers to a maximum of two other planar species and being such that it does not have a cross-linked, covalently bonded 3-dimensional structure. As such, this polymer may include rigid linkers having a site of contortion. Since these polymer chains do not pack together by virtue of their rigid contorted structure, the membrane layer possesses intrinsic microporosity and, in some cases, nanoporosity. As such, this combination of non-packed and non-crosslinked polymer chains extends in three dimensions. It may be also considered as a non-network polymer. Cross-linked polymers are also within the scope.

In some embodiments, the membrane layer comprises a thermally-rearranged polymer, which is processed at an elevated temperature from a precursor polymeric material with a low fraction of free volume elements to a thermally-rearranged polymeric material with a higher fraction of free volume elements. This transformation often proceeds by a restructuring of the covalent bonds in the precursor polymer material at the higher temperature, which significantly changes the initial polymer chain conformation and the initial polymer packing in the solid state. Such thermally rearranged polymers may feature pore sizes in the range of approximately 3 Angstroms to 5 nanometers. In some instances, a crosslinker can be used to create voids between polymer chains.

In some embodiments, the membrane layer comprises a carbon molecular sieve, which is generated from a structurally rigid and microporous polymer host (e.g., polyimide, Matrimid, poly(furfuryl alcohol), phenol-based resins, or poly(vinyl chloride) copolymers) upon pyrolysis.

In some embodiments, the membrane layer comprises an array of organic nanotubes, which can be assembled from molecular subunits (e.g., linear peptides, cyclic peptides, dendrimers, helical polymers, and guanidine quadruplexes) with pore sizes of approximately 3 Angstroms to 3 nm. In some instances, organic nanotubes benefit from exterior functionalization to align the nanotubes within a matrix (e.g., a mesostructured block copolymer film). This allows for facile processing of the membrane layer using solution processing and where a plurality of the organic nanotubes is aligned within the film such that they feature pore apertures on both sides of the membrane layer.

In some embodiments, the membrane layer comprises a zeolite, which is a class of microporous aluminosilicate, silicalite, metallosilicates, or metallophosphate framework solids. Zeolites can be prepared with uniform pore sizes ranging from approximately 3 Å to 1 nm. Their application as a membrane layer could take the form of a solid dispersion in a host material such as a polymer, as a film of exfoliated 2-dimensional layers one or several atoms thick but no more than the number of atoms in a single unit cell, or composite thereof with a polymer.

In some embodiments, the membrane layer comprises a Metal-Organic Framework, or MOF. MOFs are sometimes referred to as porous coordination polymers, but will be referred to here as MOFs. MOFs feature at least two types of building blocks, known as secondary building units-metal-containing secondary building units and organic secondary building units-which are organized periodically in space into a crystalline, porous hybrid organic-inorganic solid with pore dimensions of approximately 3 Å to 10 nm. The metal-containing secondary building units can comprise either a metal ion or a cluster of atoms containing multiple metals and other atoms. Metal-containing secondary building units serve as nodes that are linked together by polytopic organic secondary building units. MOFs amenable to post-synthetic modifications to further enhance the selectivity or permeability of the membrane layer. Their application as a membrane layer could take the form of a solid dispersion in a host material such as a polymer, as a MOF film, or as a film of exfoliated 2-dimensional layers one or several atoms thick but no more than the number of atoms in a single unit cell, or composite thereof with a polymer.

In some embodiments, the membrane layer comprises a Covalent Organic Framework (COF). Their application as a membrane layer could take the form of a solid dispersion in a host material such as a polymer, as a COF film, or as a film of exfoliated 2-dimensional sheets or composite thereof with a polymer.

This approach allows incorporation of various other components to provide different functionality (e.g., basic sites and sites for metal chelation). This type of a polymer has a high surface area (e.g., at least about 300 m$^2$ g$^{-1}$) and also sufficiently soluble in various organic solvents.

In some embodiments, the surface area of the membrane layer (as measured by nitrogen adsorption or a related technique of the dry powder prior to membrane processing) may be at least 200 m$^2$/g or at least 500 m$^2$/g such as between 200 m$^2$/g and 2200 m$^2$/g or more specifically between 600 m$^2$/g and 900 m$^2$/g. Representative methods for measuring surface area include nitrogen adsorption BET. The surface area is directly related to the porosity, essential for efficient transport of supporting electrolyte between electrodes and higher power cell operation. Typical porosities range from 20% to 70% or more specifically 30% to 60%. The surface area of the membrane layers of the present invention can be from 100 m$^2$/g to 3000 m$^2$/g, such as 100 m$^2$/g, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, or 3000 m$^2$/g. In some embodiments, the first membrane layer has a surface area of from 100 m$^2$/g to 3000 m$^2$/g, as measured by nitrogen adsorption BET.

In some embodiments, the average pore diameter of the membrane layer is of less than 100 nm, or from about 0.1 nm to about 20 nm, or from about 0.1 nm to about 10 nm, or from about 0.1 nm to about 5 nm, or from about 0.1 nm to about 2 nm, or from about 0.1 nm to about 1 nm. For example, the average pore diameter of the membrane layer can be less than about 10 nm, or less than about 9, 8, 7, 6, 5, 4, 3, 2, or 1 nm. For example, the average pore diameter of the membrane layer can be about 10 nm, or about 9, 8, 7, 6, 5, 4, 3, 2, or 1 nm. This pore diameter ensures that some materials (e.g., materials that have unit sizes greater than the pore diameter) are blocked by the membrane layer, while other materials are allowed to pass (e.g., materials with smaller unit sizes). In some embodiments, the first membrane layer has an average pore diameter of from 0.1 nm to 10 nm. In some embodiments, the first membrane layer has an average pore diameter of from 0.1 nm to 2 nm. In some embodiments, the first membrane layer has an average pore diameter of from 0.1 nm to 1 nm.

Some examples of different ion dimensions are presented in the table below. One having ordinary skill in the art would understand that the values presented in table are dependent upon the electrolyte solvating the listed materials:

| Name | Pore Diameter | Blocked by Membrane Layer |
|---|---|---|
| LiPF$_6$ (Based on Stokes radii for 0.5-1.0M) | 0.6 nm | No |
| LiTFSI (Based on Stokes radii for 0.5-1.0M) | 0.7 nm | No |
| LiBF$_4$ (Based on Stokes radii for 0.5-1.0M) | 0.5 nm | No |
| Lithium Ion (Solvated by 4 PC molecules) | 0.7 nm | No |
| Membrane Layer Pore (one example) | 0.8 nm | |
| Mn(TFSI)$_2$ solvated in electrolyte | >0.8 nm | Yes |
| Ni(TFSI)$_2$ solvated in electrolyte | >0.8 nm | Yes |
| Mn(PF$_6$)$_2$ solvated in electrolyte | >0.8 nm | Yes |
| Ni(PF$_6$)$_2$ solvated in electrolyte | >0.8 nm | Yes |
| Mn(PF$_6$)$_3$ solvated in electrolyte | >0.8 nm | Yes |
| Manganese acetylacetonate (Mn(acac)$_3$) | 1.1 nm | Yes |
| Nickel acetylacetonate (Ni(acac)$_2$) | 1.0 nm | Yes |

-continued

| Name | Pore Diameter | Blocked by Membrane Layer |
|---|---|---|
| Manganese complexes with β-ketoesters of the formula RC=OCH$_2$COOR' | >1.1 nm | Yes |

In some embodiments, the number average mass of the membrane layer is between 1×10$^3$ and 1000×10$^3$ amu or, more specifically, between 15×10$^3$ and 500×10$^3$ amu or even between 20×10$^3$ and 200×10$^3$. Larger number average mass polymers contribute to enhanced mechanical properties of the formed membrane.

The membrane layer may be in the form of a pressed powder, a collection of fibers, a compressed pellet, a film cast, sprayed or coated from solution (e.g., onto the membrane support), a composite comprised of a plurality of individual membrane layers, a free-standing film, or a supported film (e.g., by a membrane support).

In some embodiments, the membrane layer (element 144 in the above description) has a thickness of between about 5 nanometers and 20 micrometers, or between about 100 nanometers and 10 micrometers, or more specifically between about 500 nanometers and 5 micrometers.

In some embodiments, the first membrane layer includes a polymer of intrinsic microporosity.

As described above, the membrane layer may comprise a polymer having chains, each comprising repeating units bonded to each other. Each unit in the chain may include a first generally planar species comprising at least one aromatic ring and also comprising a rigid linker having a site of contortion, which is a spiro group, a bridged ring moiety, or a sterically congested single covalent bond.

Each of the first planar species may comprise at least one aromatic ring. More specifically, the first planar species comprises a substituted or unsubstituted moiety of one of the following formula, where R and R' may be any combination of alkly, aryl, olefin, alkyl ether, aryl ether, fluorinated alkyl, fluorinated aryl, fluorinated alkyl ether, Y, Y' may be any combination of alkyl, O, S, SO, SO$_2$, NH, N-alkyl, N-aryl, N-fluoro alkyl, and N-fluoro aryl.

Formula 1

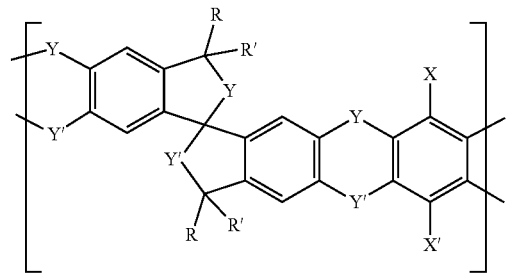

(1)

A specific example of a polymer for membrane layers is shown below, which has rigid and contorted molecular structure as shown in the following formula.

Formula 2

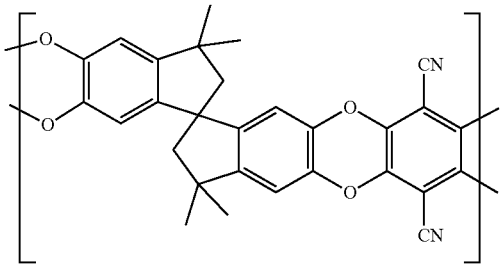
(2)

In some embodiments, the first membrane layer includes the polymer having the following structure:

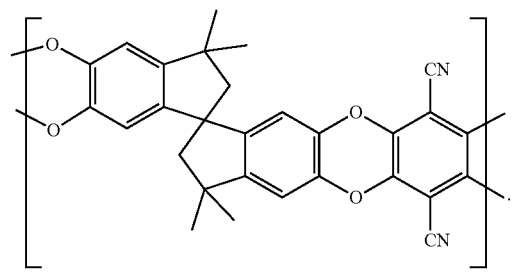

The microporosity of a membrane layer represented by Formula 2 is demonstrated by its high surface area (approximately 680-850 m$^2$/g) determined using nitrogen adsorption measurements (BET calculation). The presence of the cyano and methyl groups is optional, they may be omitted or replaced with other simple substituents. Each phenyl group may contain one or more substituents. Additionally, the nature and arrangement of substituents on the spiro-indane moiety may be chosen to provide any desirable configuration around the carbon atom common to both 5-membered rings.

A membrane layer represented by Formula 2 is freely soluble in THF and chloroform, partially soluble in DMF and insoluble in acetone, methanol, water, and organic carbonates. In solution, as a powder and as a solvent cast membrane it is highly fluorescent (yellow). Most importantly, it displays a surface area in the range 680-850 m$^2$/g. Simple molecular modelling shows that the membrane layer represented by Formula 2 is forced to adopt a contorted configuration due to the presence of the spiro-indane centers, each of which acts as a "site of contortion". In addition, the fused ring structure ensures that the randomly contorted structure of each polymer molecule is locked so that the molecules cannot pack efficiently resulting in microporosity.

Examples of the polymer membrane layer may be prepared in good yield from the aromatic nucleophilic substitution reaction between (3) and (4) as shown below in reaction scheme A:

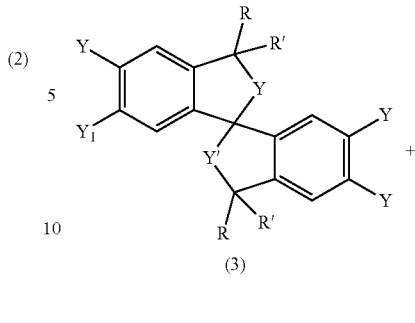
(3)

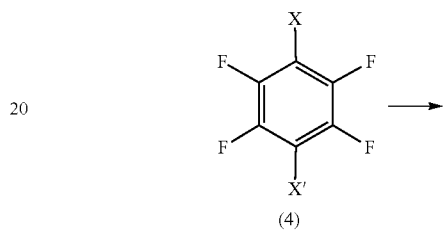
(4)

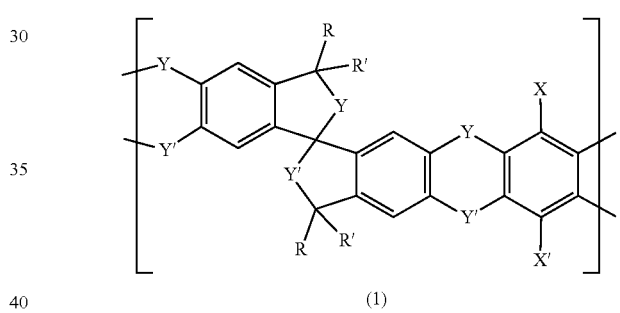
(1)

Without being restricted to any particular theory, it is believed the five and six-membered ring structure has a robust chemical nature.

Combinations of porous or non-porous polymers with common porous or non-porous materials may also serve as a membrane layer, including but not limited to combinations of fluoro-polymeric fibers of poly(ethylene-co-tetrafluoroethylene (PETFE) and poly(ethylenechloro-co-trifluoroethylene) (e.g., a fabric woven from these used either by itself or laminated with a fluoropolymeric microporous film), polystyrenes, polyarylether sulfones, polyvinyl chlorides polypropylene, polyethylene (including LDPE, LLDPE, HDPE, and ultra high molecular weight polyethylene), polyamides, polyimides, polyacrylics, polyacetals, polycarbonates, polyesters, polyetherimides, polyimides, polyketones, polyphenylene ethers, polyphenylene sulfides, polymethylpentene, polysulfones non-woven glass, glass fiber materials, ceramics, metal oxides, MOFs, zeolites, porous carbons, composites of organic and inorganic species, and a polypropylene membrane.

The membrane layers may be cross-linked using a suitable cross-linking agent. Such cross-linking may render the membrane partially or completely insoluble in organic solvents, which may be desirable in certain applications.

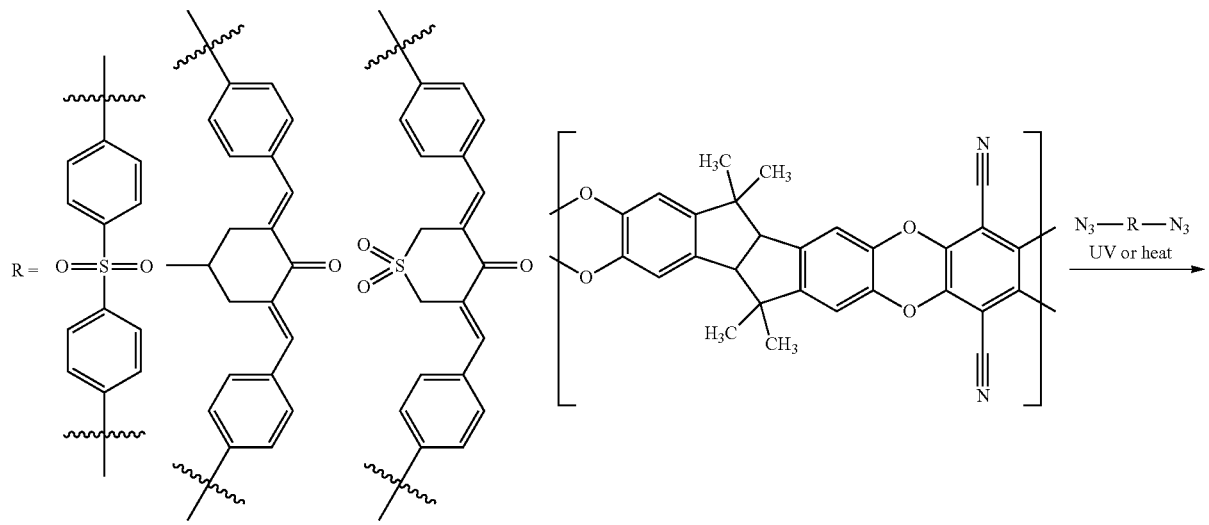

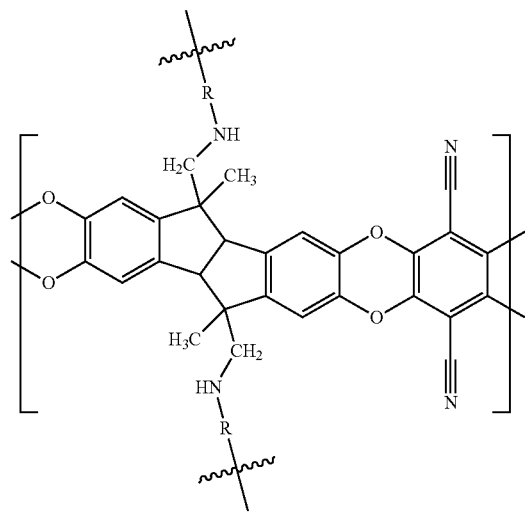

In one aspect, the membrane layer can include at least one of an aliphatic or aromatic polyamide, aromatic polyhydrazide, poly-benzimidazolone, polyepiamine/amide, polyepiamine/urea, poly-ethyleneimine/urea, sulfonated polyfurane, polyether, a polyether-amide, a polyether-urea, a polyester, a polyester-amide, polybenzimidazole, polypiperazine isophtalamide, or a polyimide or a copolymer thereof or a mixture thereof. The polymer selected to form the membrane layer can be formed by an interfacial polymerization reaction.

In some embodiments, the monomers used to form the membrane layer can include a molecule with a concave shape (i.e. concavity), preferably rigid and linked to another monomer or monomers to form a polymer network within which molecular rotation is preferably hindered. Concavity-containing monomers include but are not limited to molecules containing a spiro-contorted centre, bridged ring moieties and sterically congested single covalent bonds around which there is restricted rotation. These molecules are also known as molecules with awkward shapes (i.e. those that pose packing problems due to their concavities). Structural units with well-defined cavities include but are not limited to 1,1-spirobisindanes, 9,9-spirobisfluorenes, bisnaphthalenes, 1,1-spirobis,2,3,4-tetrahydro-naphthalenes, and 9,10-ethanoanthracene. Generally, the membrane layers can be prepared by reaction of two or more monomers, wherein at least one of the monomers possesses concavity. In one aspect the first monomer is a dinucleophilic or polynucleophilic monomer and the second monomer is a dielectrophilic or a polyelectrophilic monomer. Wherein, each monomer can have two or more reactive groups. Both electrophiles and nucleophiles are well known in the art, and one of skill in the art can choose suitable monomers for the interfacial polymerisation reaction. The first and second monomers can be chosen so as to be able to undergo an interfacial polymerisation reaction to form a three-dimensional polymer network when brought into contact.

The monomers and polymers for making polymers of intrinsic microporosity useful in the present invention are known to one of skill in the art. For example, representative monomers and polymers can be found in U.S. Publication No. 2014/0251897; Sci. China Chem 2017, 60(8), 1023; Nature Materials 2017, 16, 932; Adv. Energy Matr. 2016, 1600517.

The polymers of intrinsic microporosity that can be used in the present invention can be prepared by a variety of methods, including interfacial polymerization (Nature Materials 2016, 15, 760-767).

In a further embodiment of this invention, the membrane layer can include a network comprised of but not limited to, a polyester, a polyether, a polyamide, a polyimide or a mixture thereof. The polyester, polyamide, polyether or polyimide can be aromatic or non-aromatic. For example, the polyester can comprise residues of a phthaloyl (e.g. terephthaloyl or isophthaloyl) halide, a trimesoyl halide, or a mixture thereof. In another example, the polyester can comprise residues of a polyphenol containing a spiro-contorted centre, or bridged ring moieties or sterically congested single covalent bonds around which there is restricted rotation, or a mixture thereof. Wherein, a concave monomer may include but is not limited to small oligomers (n=0-10) of a polymer with intrinsic microporosity (PIM) containing nucleophilic or electrophilic reactive groups. One of skill in the art can choose suitable PIMs oligomers with reactive groups able to undergo an interfacial polymerisation reaction, which include but are not limited to polyphenols or polyamines. In a further embodiment, the layer comprises residues of a trimesoyl halide and residues of a tetraphenol with a spiro-contorted centre. In a further embodiment, the film comprises residues of trimesoyl chloride and 5,5',6,6'-Tetrahydroxy-3,3,3',3'-tetramethyl-1,1'-spirobisindane. In a further aspect, the film comprises the reaction product of trimesoyl chloride and the sodium salt of 5,5',6,6'-Tetrahydroxy-3,3,3',3'-tetramethyl-1,1'-spirobisindane (TTSBI).

In some embodiments, separator 140 may include second membrane layer 146. The position of second membrane layer 146 may be such that membrane support 142 is disposed between first membrane layer 144 and second membrane layer 146 as, for example, is shown in FIG. TA. Alternatively, first membrane layer 144 and second membrane layer 146 may be disposed on the same side of membrane support 142 as, for example, schematically shown in FIG. 1D and FIG. 1E. Furthermore, first membrane layer 144 and second membrane layer 146 may be used without membrane support 142 as noted above. For example, both first membrane layer 144 and second membrane layer 146 may be formed on one of the electrodes or first membrane layer 144 may be formed on one electrode while second membrane layer 146 may be formed on a different electrode.

First membrane layer 144 and second membrane layer 146 may have the same composition, same porosity (pore size and porosity), and/or the same thickness. These embodiments may be referred to as a mirrored membrane layer arrangement (regardless of first membrane layer 144 and second membrane layer 146 being positioned on the same side of membrane support 142 or different sides of membrane support 142 or used without membrane support 142 as noted above). Alternatively, one or more characteristics of first membrane layer 144 and second membrane layer 146 may be different. For example, second membrane layer 146 may include a polymer different from that of first membrane layer 144 or a ceramic coating blended with a polymer binder. In some embodiments, second membrane layer 146 is a ceramic separator coating. Some examples of ceramic materials that can be used in second membrane layer 146 include, but are not limited to, aluminum oxide, silicon oxide, silicon carbide, titanium dioxide, magnesium oxide, tin oxide, cerium oxide, zirconium oxide, barium titanite, yttrium oxide, boron nitride, ion conducting ceramic (e.g., (Li,La)TiO$_3$, Li—La—Zr—O, sulfide based electrolytes), and combinations thereof. These ceramic materials may be present in the form of particles, flakes, and/or rods and may be supported by a base matrix material such as a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof.

Second membrane layer 146 may have various features, but not limited to, thermal shutdown, high temperature dimensional stability, and oxidative stability which may not be available from first membrane layer 144.

First membrane layer 144 and/or second membrane layer 146, if present, may be laminated to membrane support 142. Alternatively, first membrane layer 144 and/or second membrane layer 146, if present, may be laminated to or coated on to the electrodes as, for example, schematically shown in FIG. 1F. One having ordinary skills in the art would understand that in some embodiments, e.g., electrochemical energy storage cells, membrane support 142 may be in direct physical contact with first membrane layer 144 (in the final electrochemical cell) even though first membrane layer 144 may be formed on the electrode (e.g., positive electrode 110). Specifically, if membrane support 142 is present, it may come in contact with first membrane layer 144 and second membrane layer 146, if present, when assembling (e.g., stacking or winding) electrochemical cell 100.

In some embodiments, separator 140 may include only one membrane layer, i.e., first membrane layer 144. In these embodiments, separator 140 may still include membrane support 142 as, for example, is shown in FIG. 1B. First membrane layer 144 may be positioned between membrane support 142 and one of positive electrode 110 or negative electrode 120 or, more specifically, between membrane support 142 and positive electrode 110. Without being restricted to any particular theory, it is believed that positive electrode 110 may be operable as a source of second species 134 and it may be desirable to avoid second species 134 from passing into membrane support 142

Figure 1C:
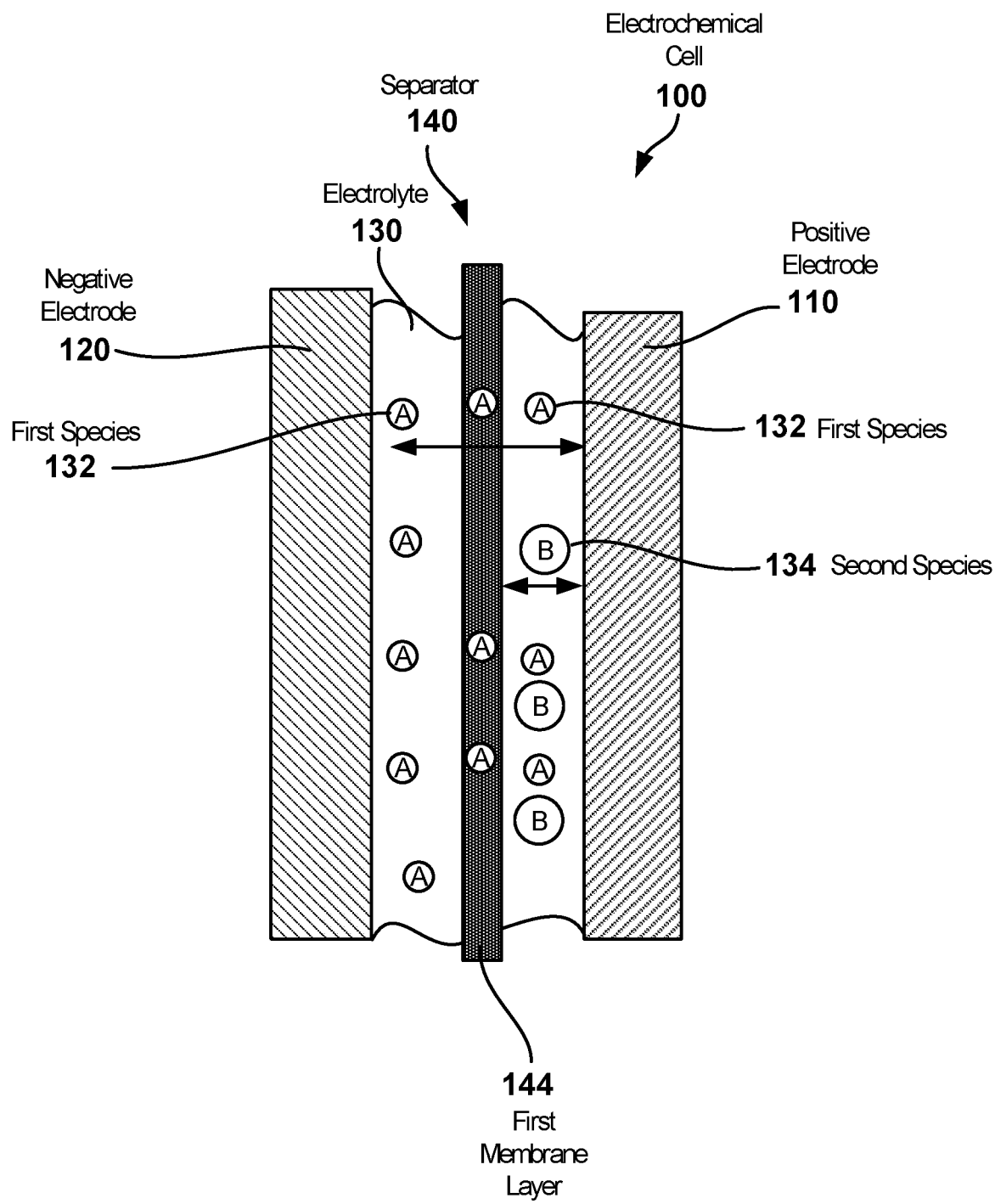
Figure 1D:
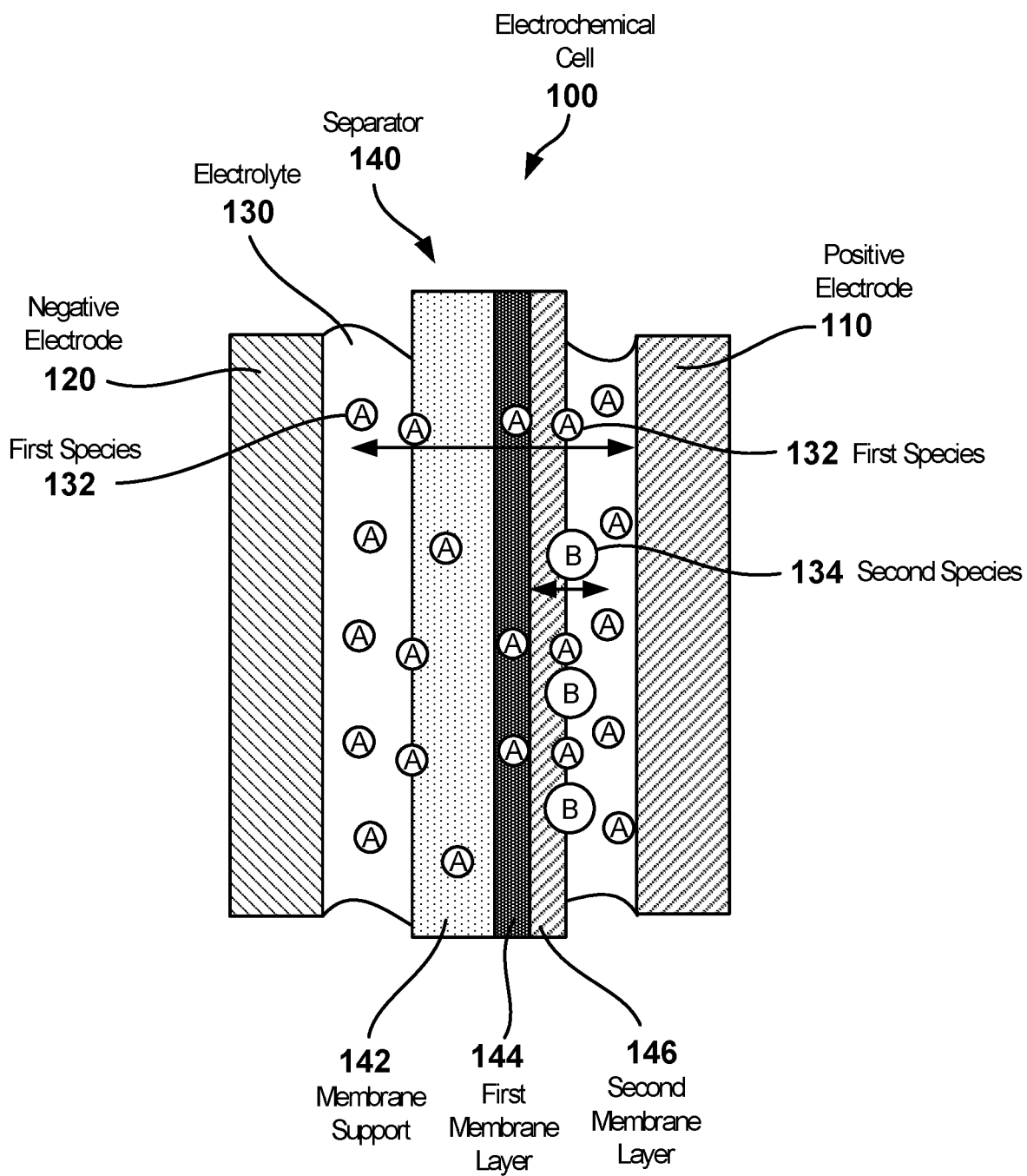
Figure 1E:
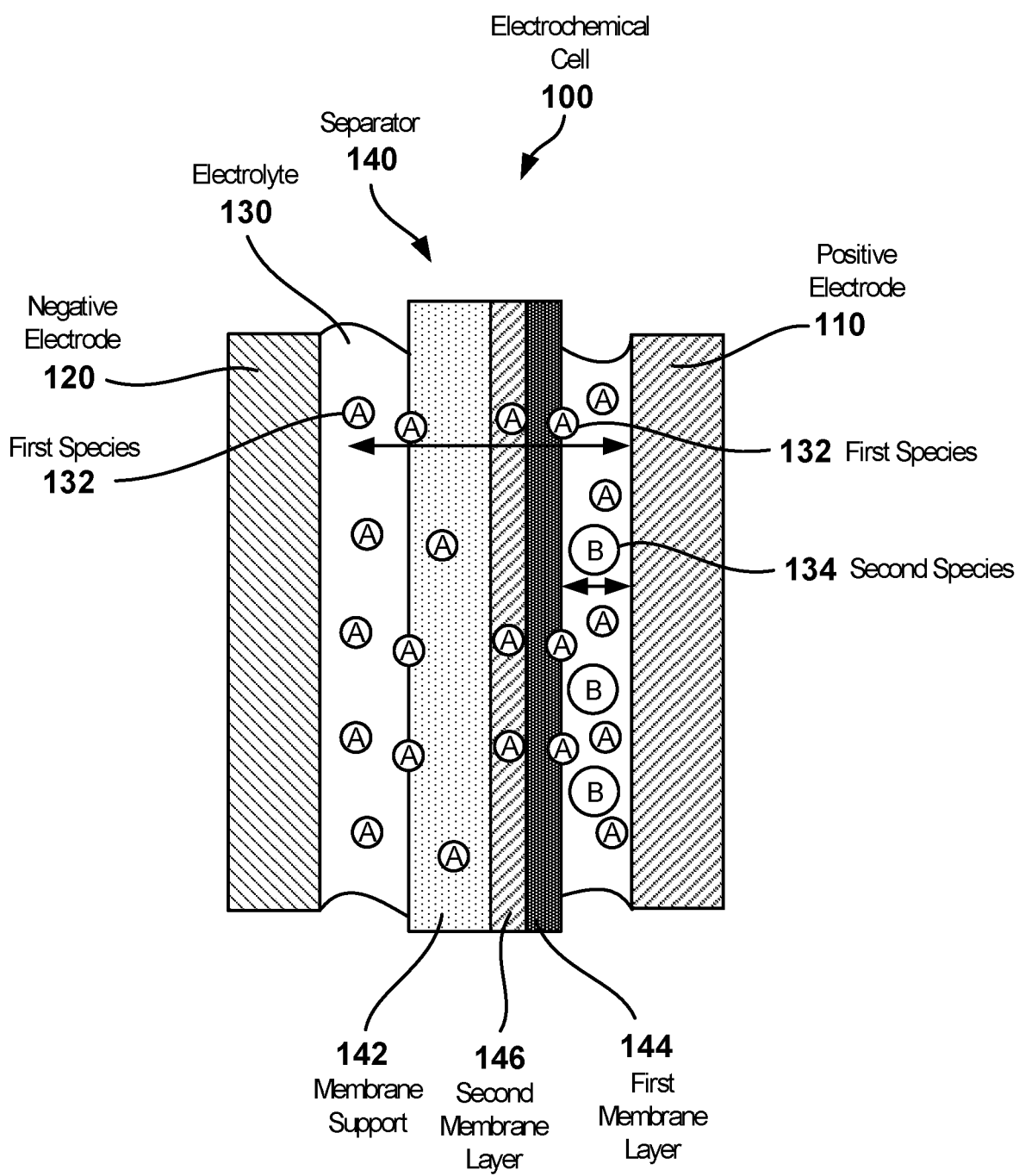
Figure 1F:
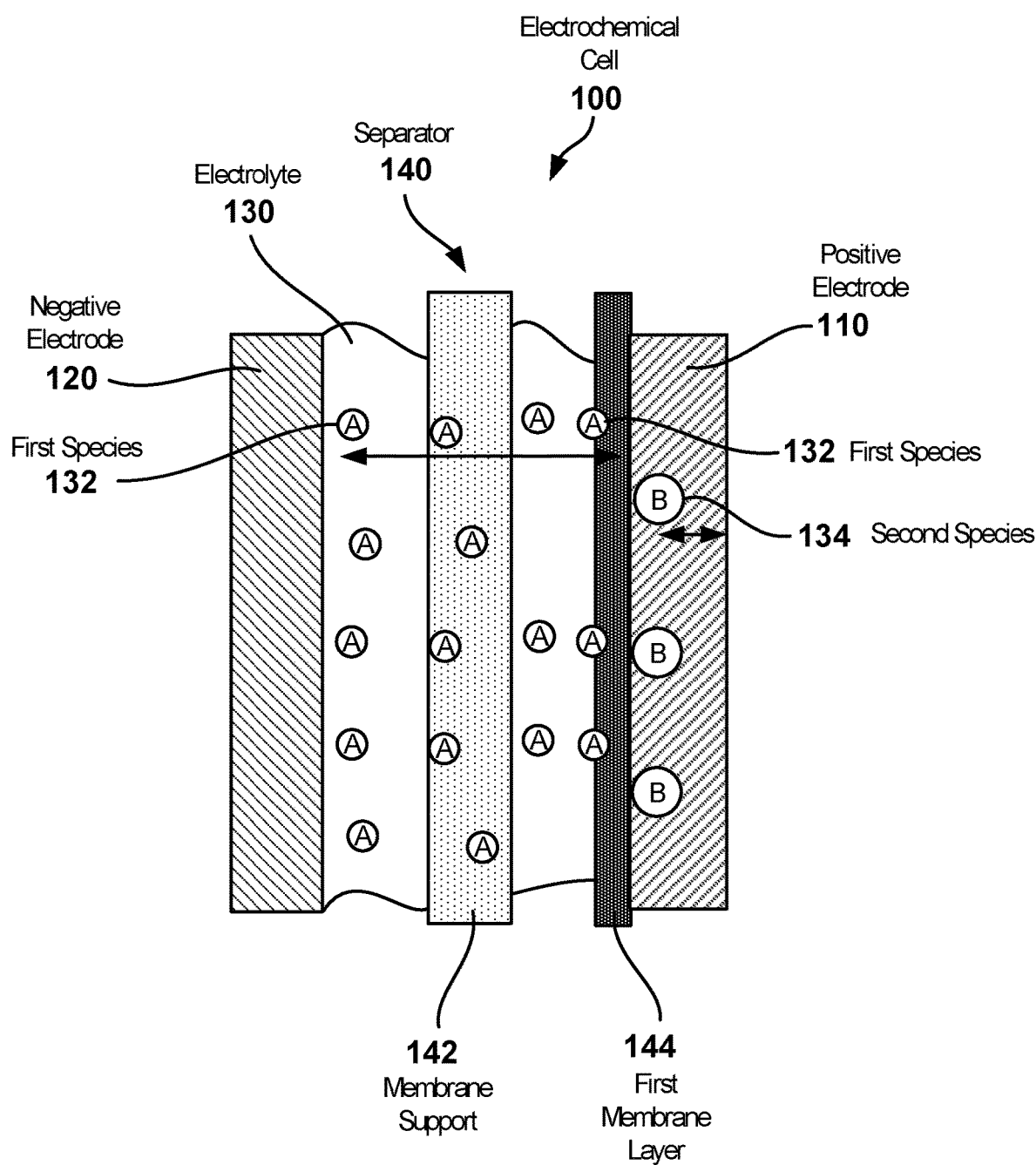

Alternatively, first membrane layer 144 may be used without membrane support 142 as, for example, shown in FIG. 1C. In this last example, the support to first membrane layer 144 may be provided by positive electrode 110 or negative electrode 120. For example, first membrane layer 144 may be formed on positive electrode 110 or negative electrode 120 (e.g., coated right on the electrode). Alternatively, membrane layer 144 may be self-supportive.

Figure 1G:
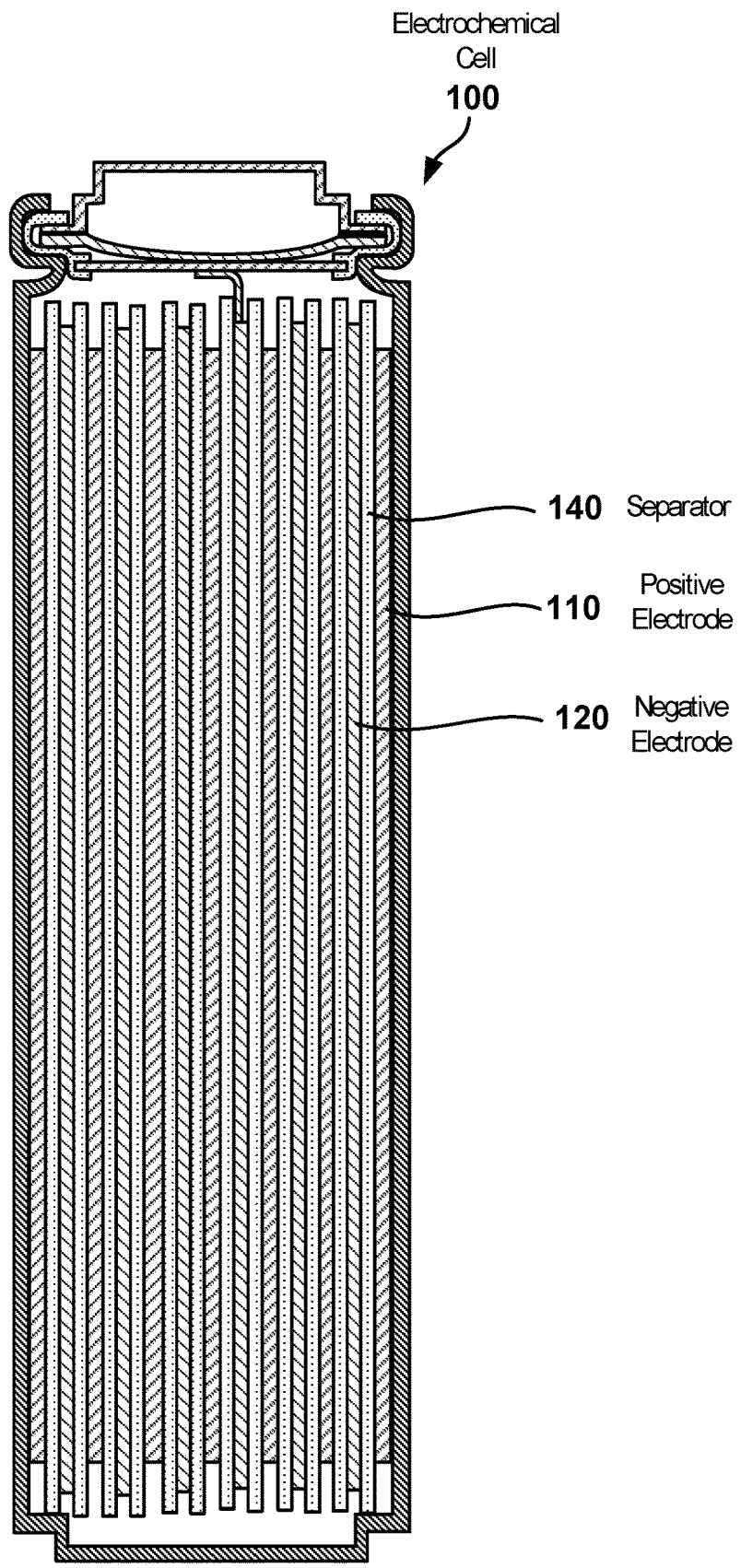

FIG. 1G illustrate an example of electrochemical cell 100 in which positive electrode 110, negative electrode 120, and separator 140 may be arranged into a repetitive structure. This type of electrode arrangement may be used for energy storage devices. Separator 140 is positioned between each adjacent pair of positive electrode 110 and negative electrode 120. For example, multiple positive electrodes 110, negative electrodes 120, and separators 140 may be stacked. Separator 140 provides physical separation between positive electrode 110 negative electrode 120 and prevent an electrical short between these electrodes while allow for ions migration between the electrodes.

C. Electrolyte

Separator 140 is configured to allow transport of first species 132 (identified as A in FIG. 1) between positive electrode 110 and negative electrode 120. At the same time, separator 140 is configured to block second species 134. Each component of electrochemical cell 100 will now be described in more detail. Some examples of first species 132 include, but are not limited to, atoms, ions, ion pairs, and molecules of the following examples, but not limited to, $H^+$, $Li^+$, $Na^+$, $K^+$, $Rb^+$, $Cs^+$, $Mg^{2+}$, $Ca^{2+}$, $F^-$, $Cl^-$, $Br^-$, $I^-$, $BF_4^-$, $PF_6^-$, $AsF_6^-$, $ClO_4^-$, methanesulfonate, trifluoromethanesulfonate, tris(pentafluoroethyl)trifluorophosphate, bis(fluorosulfonyl)imide, cyclo-difluoromethane-1,1-bis(sulfonyl)imide, cyclo-hexafluoropropane-1,1-bis(sulfonyl)imide, bis(trifluoromethanesulfonylimide), bis(perfluoroethanesulfonyl)imide, bis(oxalate)borate, difluoro(oxalate)borate, bis(fluoromalonato)borate, tetracyanoborate, dicyanotriazolate, dicyano-trifuloromethyl-imidazolate, dicyano-pentafuoroethyl-imidazoleate, and ion pairs thereof. Some specific examples of first species 132 include $H^+$, $Li^+$, $Na^+$, $Mg^{2+}$, $Ca^{2+}$, $PF_6^-$, methanesulfonate, and trifluoromethanesulfonate (which are utilized in many types of electrochemical storage devices and electrocatalytic cells). In some embodiments, the first species includes an ion having a charge of +1. In some embodiments, the first species is selected from the group consisting of $H^+$, $Li^+$, $Na^+$ and $K^+$. In some embodiments, the first species is selected from the group consisting of $F^-$, $Cl^-$, $Br^-$, $I^-$, $BF_4^-$, $PF_6^-$, $AsF_6^-$, $ClO_4^-$, methanesulfonate, trifluoromethanesulfonate, tris(pentafluoroethyl)trifluorophosphate, bis(fluorosulfonyl)imide, cyclo-difluoromethane-1,1-bis(sulfonyl)imide, cyclo-hexafluoropropane-1,1-bis(sulfonyl)imide, bis(trifluoromethanesulfonylimide), bis(perfluoroethanesulfonyl)imide, bis(oxalate)borate, difluoro(oxalate)borate, bis(fluoromalonato)borate, tetracyanoborate, dicyanotriazolate, dicyano-trifuloromethyl-imidazolate, and dicyano-pentafuoroethyl-imidazoleate.

Some examples of second species 134 include, but are not limited to, atoms, ions (oxidation states ranging from −3 to +7, including oxide, sulfide, and selenide complexes), ion pairs, coordination complexes, and molecules of the following examples, but not limited to, Be, Mg, Ca, Sr, Ba, Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, B, C, N, O, Al, Si, P, S, Ga, Ge, As, Se, In, Sn, Sb, Te, Tl, Pb, Bi, Po, La, Ce, Pr, Nd, Pm, Sm, Eu, Gd, Tb, Dy, Ho, Er, Tm, Yb, Ac, Th, Pa, U, methanesulfonate, trifluoromethanesulfonate, tris(pentafluoroethyl)trifluorophosphate, bis(fluorosulfonyl)imide, cyclo-difluoromethane-1,1-bis(sulfonyl)imide, cyclo-hexafluoropropane-1,1-bis(sulfonyl)imide, bis(trifluoromethanesulfonylimide), bis(perfluoroethanesulfonyl)imide, bis(oxalate)borate, difluoro(oxalate)borate, bis(fluoromalonato)borate, tetracyanoborate, dicyanotriazolate, dicyano-trifuloromethyl-imidazolate, dicyano-pentafuoroethyl-imidazoleate, acetylacetonate, acetylacetone, a β-ketoester of the formula $RC=OCH_2COOR'$, where R and R' are each independently $C_{1-6}$ alkyl, $C_{6-12}$ aryl, or $C_{1-6}$ alkoxy-$C_{1-6}$ alkyl or a combination of, and ion pairs thereof, β-ketoacids or salts thereof with the formula $RC=OCH_2COOR'$, where R are alkyl, aryl, or ether chains or a combination of and $R'=H^+$, $Li^+$, $Na^+$, $K^+$, $Rb^+$, or $Cs^+$, and ion pairs thereof. Specific examples of second species 134 include oxides, sulfides, and selenide complexes (with oxidation states ranging from −3 to +7 in these oxides, sulfides, and selenide complexes) as well as ion pairs, coordination complexes, and molecules of the following examples, Mn, Fe, Co, Ni, Cu, Zn, Ba, Pb, acetylacetonate, acetylacetone, a β-ketoester of the formula $RC=OCH_2COOR'$, where R and R' are each independently $C_{1-6}$ alkyl, $C_{6-12}$ aryl, or $C_{1-6}$ alkoxy-$C_{1-6}$ alkyl or a combination of, β-ketoacids or salts thereof with the formula $RC=OCH_2COOR'$, where R are $C_{1-6}$ alkyl, $C_{6-12}$ aryl, or $C_{1-6}$ alkoxy-$C_{1-6}$ alkyl or a combination of and $R'=H^+$, $Li^+$, $Na^+$, $K^+$, $Rb^+$, or $Cs^+$, and ion pairs thereof-all species that are commonly utilized in electrochemical storage devices and electrocatalytic cells. For example, the transport of Mn ions from the electrolyte or positive electrode to the negative electrode in a lithium-ion battery results in undesirable rapid cell capacity fade. In another example, the transport of metal ions from the electrolyte or positive electrode to the negative electrode in an electrowinning/electroplating/electrorefining cell results in reduced performance of the desired reaction.

The metal ion of the second species can have any suitable charge, such as +1, +2, +3, +4, +5, +6 or greater. In some embodiments, the second species comprises a metal ion having a charge of at least +1. In some embodiments, the second species comprises a metal ion having a charge of at least +2. In some embodiments, the second species comprises a metal ion having a charge of at least +3. In some embodiments, the second species comprises a metal ion having a charge of +1. In some embodiments, the second species comprises a metal ion having a charge of +2. In some embodiments, the second species comprises a metal ion having a charge of +3.

The metal ion of the second species can be a transition metal, post-transition metal, rare earth metal, or semi-metal. Transition metals include the elements Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg and Ac. Post-transition metals include the elements Al, Ga, In, Tl, Ge, Sn, Pb, Sb, Bi, and Po. Rare earth metals include the elements Sc, Y, La, Ce, Pr, Nd, Sm, Eu, Gd, Tb, Dy, Ho, Er, Tm, Yb and Lu. Semi-metals include at least the elements As, Sb, Bi, and Sn. One of skill in the art will appreciate that the metals described above can each adopt several different oxidation states, all of which are useful in the present invention. In some instances, the most stable oxidation state is formed, but other oxidation states are useful in the present invention.

In some embodiments, the metal ion comprises a transition metal or a semi-metal. In some embodiments, the metal ion comprises a transition metal. In some embodiments, the metal ion is selected from the group consisting of Mn, Fe, Ni and Cu.

The second species can also include any suitable ligand that binds to and stabilizes the metal ion. In some embodiments, the ligand can be methanesulfonate, trifluoromethanesulfonate, tris(pentafluoroethyl)trifluorophosphate, bis(fluorosulfonyl)imide, cyclo-difluoromethane-1,1-bis(sulfonyl)imide, cyclo-hexafluoropropane-1,1-bis(sulfonyl)imide, bis(trifluoromethanesulfonylimide), bis(perfluoroethanesulfonyl)imide, bis(oxalate)borate, difluoro(oxalate)borate, bis(fluoromalonato)borate, tetracyanoborate, dicyanotriazolate, dicyano-trifuloromethyl-imidazolate, dicyano-pentafuoroethyl-imidazoleate, acetylacetonate, acetylacetone, and a β-ketoester of the formula $RC=OCH_2COOR'$, where R and R' are each independently $C_{1-6}$ alkyl, $C_{6-12}$ aryl, or $C_{1-6}$ alkyl-$C_{1-6}$ alkoxy.

In some embodiments, the second species is selected from the group consisting of manganese (II) bis(trifluoromethanesulfonyl)imide ($Mn(TFSI)_2$), nickel(II) bis(trifluoromethanesulfonyl)imide ($Ni(TFSI)_2$), and copper bis(trifluoromethanesulfonyl)imide (CuTFSI).

Electrolyte 130 may be aqueous or non-aqueous. Some examples of solvents used in a non-aqueous electrolyte include, but are not limited to cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitrites (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), and organic compounds containing an S=O group (e.g., dimethyl sulfone and divinyl sulfone), sulfones, nitriles, dinitriles, carboxylates, and combinations thereof. Acids such as $HSO_3CH_xF_y$ (where $y=1-x$) may be included in the electrolyte. A salt for liquid electrolytes may include one or more of the following: $LiPF_6$, $LiBF_4$, $LiClO_4$, $LiAsF_6$, $Li(CH_3SO_3)$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li$), and combination of thereof. Common combinations include $LiPF_6$ and $LiBF_4$, $LiPF_6$ and $LiN(CF_3SO_2)_2$, $LiBF_4$ and $LiN(CF_3SO_2)_2$.

In one embodiment the total concentration of salt in a liquid non-aqueous solvent (or combination of solvents) is at least about 0.3 M; in a more specific embodiment, the salt concentration is at least about 0.7 M. The upper concentration limit may be driven by a solubility limit or may be no greater than about 2.5 M; in a more specific embodiment, no more than about 1.5 M.

In one embodiment electrolyte additives, including but not limited to, methanesulfonate, trifluoromethanesulfonate, tris(pentafluoroethyl)trifluorophosphate, bis(fluorosulfonyl) imide, cyclo-difluoromethane-1,1-bis(sulfonyl)imide, cyclo-hexafluoropropane-1,1-bis(sulfonyl)imide, bis(trifluoromethanesulfonylimide), bis(perfluoroethanesulfonyl) imide, bis(oxalate)borate, difluoro(oxalate)borate, bis(fluoromalonato)borate, tetracyanoborate, dicyanotriazolate, dicyano-trifluoromethyl-imidazolate, dicyano-pentafuoroethyl-imidazoleate, and vinylethylene carbonate (VEC) may be included in electrolyte 130.

D. Examples of Forming Separators and Electrochemical Cells

Separator 140 may be processed by delivering first membrane layer 144 from a solution by drop casting, coating, including, but not limited to, gravure, dip, slot-die, mayer rod, 1-2-3 roll (forward and reverse), and slide and polishing bar. First membrane layer 144 may be coated on a release substrate, a non-stick surface, membrane support 142, and second membrane layer 146. Desolvation of first membrane layer may occur under ambient conditions, via heating, and under reduced pressure.

Figure 3:
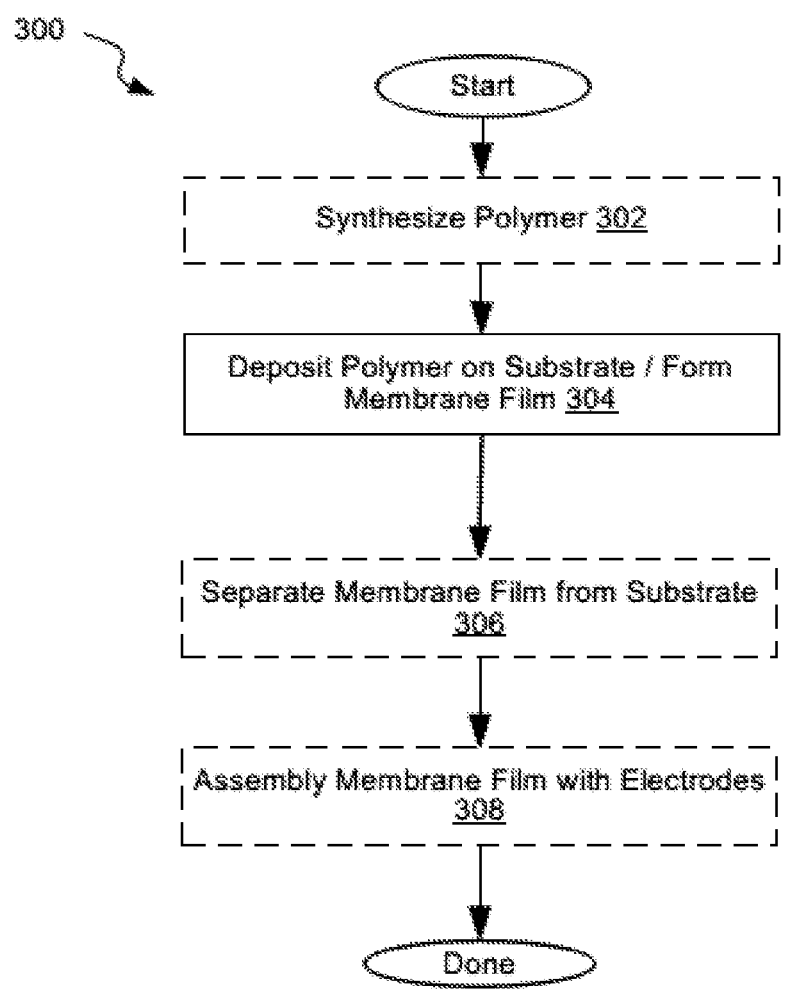
FIG. 3 is a process flowchart corresponding to a method of forming a separator for an electrochemical cell, in accordance with some embodiments.

FIG. 3 is a process flowchart corresponding to method 300 of forming a separator for an electrochemical cell, in accordance with some embodiments. Method 300 may commence with synthesize a polymer during optional operation 302.

Method 300 may proceed with depositing a polymer layer on a substrate during operation 304. For example, the polymer layer may be deposited using a polymer solution, in which previously synthesized polymer may be dissolved in a solvent. The deposition may be performed using various techniques such as by drop casting, coating, including, but not limited to, gravure, dip, slot-die, mayer rod, 1-2-3 roll (forward and reverse), and slide and polishing bar. First membrane layer 144 may be coated on a release substrate, a non-stick surface, membrane support 142, and second membrane layer 146. Desolvation of first membrane layer may occur under ambient conditions, via heating, and under reduced pressure. The substrate may be a temporary liner (removed during later operation 306), a membrane carrier, a membrane support, or an electrode.

IV. ADDITIONAL APPLICATIONS OF SEPARATOR

While this disclosure focuses on electrochemical cells and in particular rechargeable electrochemical cells, other applications of the separator are also within the scope. For example, separator 140 may be used in electrowinning/electroplating/electrorefining of metals. Specifically, electrowinning processes for metals such as Cu, Au, Ag, Zn, Al, Cr, Co, Mn, Pd, Pt, Pb, all transition metals, all semimetals, all rare-earth metals (all lanthanides and actinides), all alkali metals, and all alkali earth metals may benefit from use of separator 140 where the separator prevents unwanted deposition of one species at an electrode by blocking transport of that species or a precursor to that species. Examples of such species include, but are not limited to, cationic metal complexes and anionic oxides, sulfides, and selenides of metals. The process may be carried out under aqueous, non-aqueous, or mixed solvent systems.

Other uses include, but are not limited to, capacitive desalination and molecular separation. Electrochemical cells useful for capacitive desalination include those described in U.S. Publication Nos. 2012/0273359 and 2014/0202880. Electrochemical cells useful for molecular separation include those described in U.S. Publication No. 2015/0218210. One of skill in the art will appreciate the electrochemical cells of the present invention are useful in other capacitive desalination and molecular separation devices.

V. EXAMPLES

Example 1: Preparation and Testing of Hybrid Films

Figure 2A:
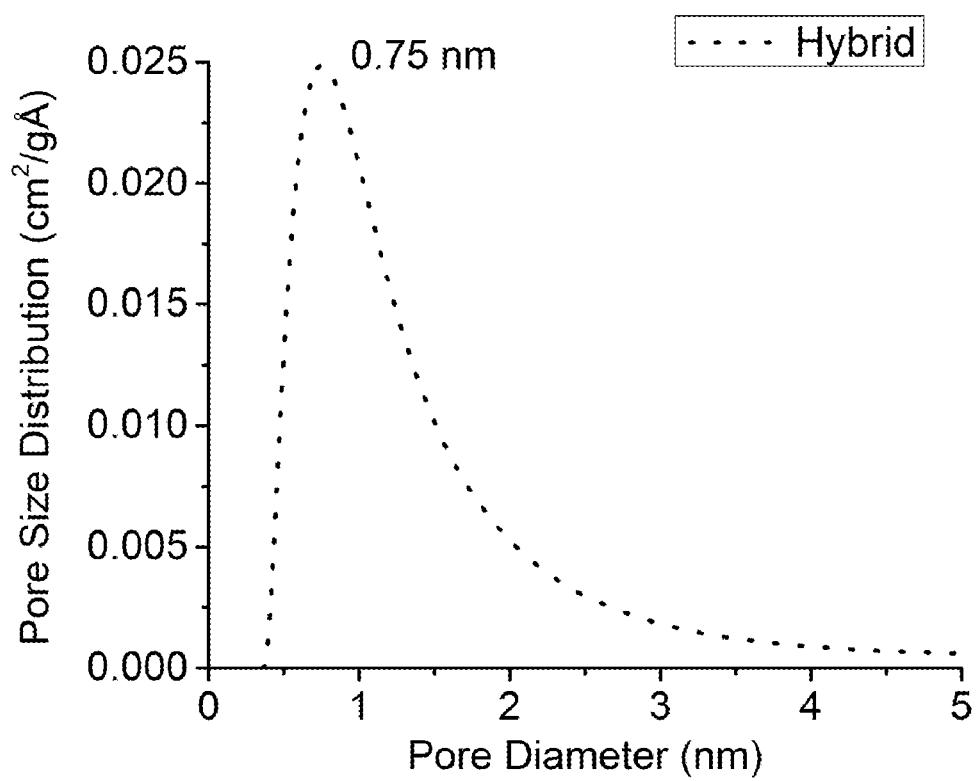
FIGS. 2A-2E are experimental results for different configurations of separators.

Various experiments have been conducted to determine performance of proposed separators in electrochemical cells. In one experiment, a material for a membrane layer was synthesized from monomers and was cast from a solution into flexible free-standing membrane layers that were about 10-12 micrometers thick. The specific surface area was determined to be 795 $m^2/g$. The pore size distribution was determined using nitrogen adsorption isotherms and the results are shown in FIG. 2A with line 202. Specifically, the membrane layers had a nominal pore size of 0.75 nanometers. This pore size would be suitable for selective transport of $LiPF_6$ while blocking manganese acetylacetonate as noted above. This stands in stark contrast with commercially available CELGARD 2325 battery separators (available from Celgard, LLC in Charlotte, North Carolina), which have pore sizes >20 nanometers as advertised by Celgard. CELGARD is far too large for size-selective blocking manganese acetylacetonate, $Mn(TFSI)_2$, $Ni(TFSI)_2$, or other like species common in electrochemical cells. Manganese acetylacetonate serves as a surrogate for common manganese complexes formed due to dissolution of manganese containing electrodes in electrochemical cells.

Crosslinking of Hybrid Films

The hybrid membrane was crosslinked using the method of Du et al. (*Macromol. Rapid Commun.* 2011, 32, 631-636). Crosslinked hybrid membranes were prepared by a nitrene reaction from a polymer of intrinsic microporosity in the presence of 10 mol % 2,6-bis(4-azidobenzylidene)-4-methylcyclohexanone. The reaction was initiated by 20 minutes of exposure to 365 nm wavelength UV radiation. To assure crosslinking, fourier-transform infrared spectroscopy (FTIR) was used to show a decrease in the characteristic band of 2,6-bis(4-azidobenzylidene)-4-methylcyclohexanone at 2100 cm$^{-1}$.

Electrochemical Stability of Hybrid Films

Figure 2B:
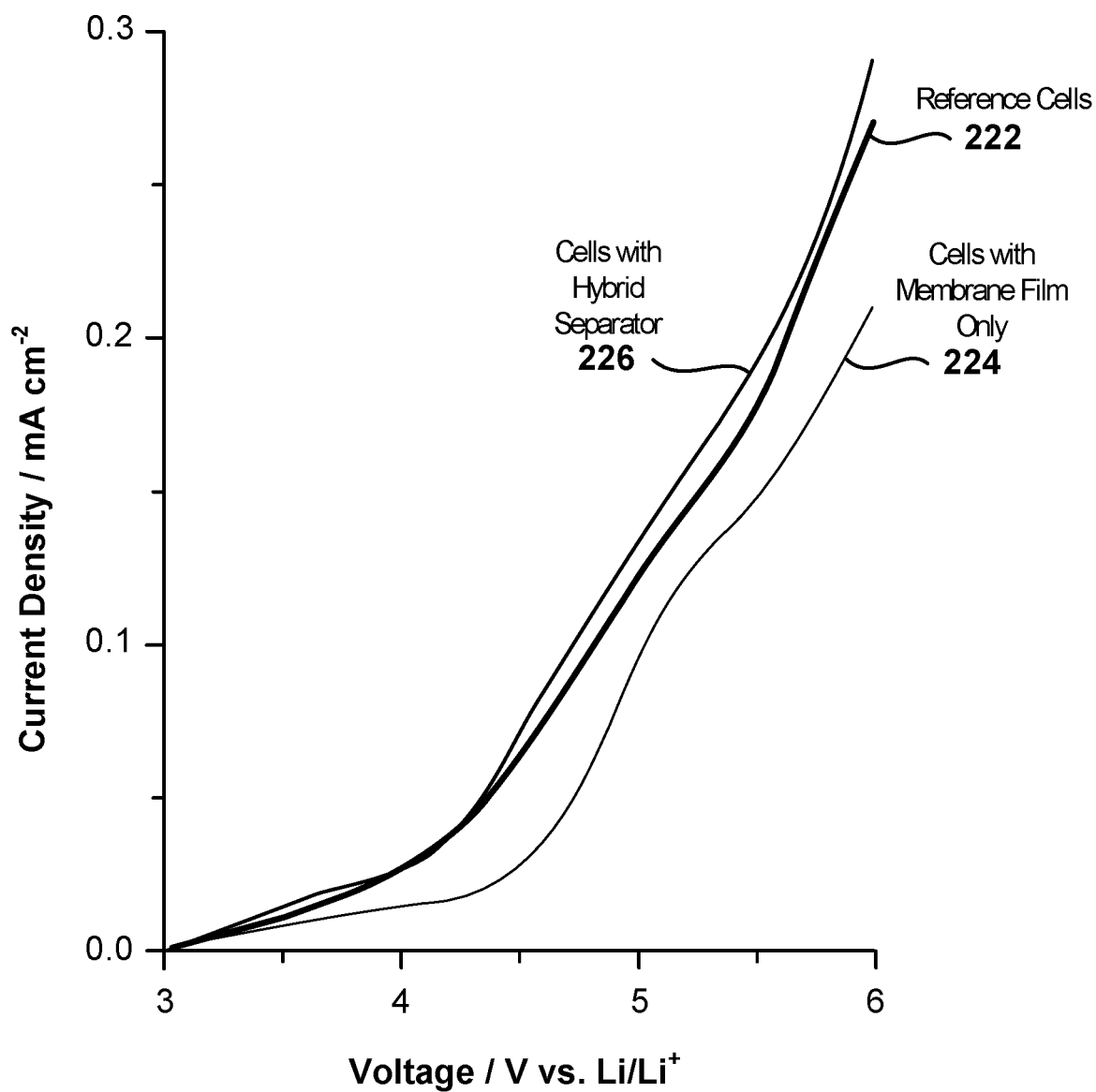

In another experiment, a membrane layer having a thickness of about 2 micrometers was deposited (blade-coated) onto CELGARD 2325 used as a membrane support. The deposited solution used chloroform as a solvent. However, similar membrane layers may be formed from THF, dichloromethane, DMF, or mixtures with other common organic solvents. Without being bound to one particular theory, it is anticipated that the hybrid separator maintains the mechanical and safety features of the underlying membrane support. Li/Al cells were when assembled with CELGARD film used by itself (as a reference), with the hybrid separator, and also with the membrane film only (no CELGARD). Electrolyte used in all cells was 2:1 diethylcarbonate (DEC):ethylenecarbonate (EC) containing 1.0 M LiPF$_6$ salt. The electrochemical stability of all three types of cells is shown in FIG. 2B, with line 222 representing the reference cells assembled with the CELGARD film only, line 224 representing test cells assembled with the membrane film only (no CELGARD), and line 226 representing test cells assembled with the hybrid separator (CELGARD film and membrane film). The onset of a steep current increase around 4.5 V for all three types of cells is attributed to the breakdown of LiPF$_6$ electrolyte and the aluminum current collector. This data indicates that the membrane film is stable at typical operating conditions of lithium ion cells.

Infiltration of Hybrid Films with Electrolyte

Another test was conducted to demonstrate that the pores of a membrane film are readily infiltrated with electrolyte, creating an ionically percolating solution-phase conductive network, despite their small size. It has been found that approximately 67% of the volume of the hybrid separator is filled by the electrolyte calculated by a mass uptake measurement upon soaking the dry hybrid separator in electrolyte, patting dry, then taking the weight difference from dry and electrolyte infiltrated hybrid separator.

Ionic Conductivity of Hybrid Films

Another test was conducted to evaluate ionic conductivity of different separators. Ionic conductivity of CELGARD 2325 was 2.7×10$^{-4}$ S/cm, ionic conductivity of the membrane film alone was 1.4×10$^{-5}$ S/cm), while ionic conductivity of the hybrid separator (a membrane film (2 microns thick) coated onto CELGARD (25 microns thick)) was 1.1×10$^{-4}$ S/cm. All ionic conductivities were measured in electrolyte 2:1 DEC:EC containing 1.0 M LiPF$_6$. By comparing the membrane ionic conductivities for the CELGARD alone sample (25 microns thick) and for the membrane film alone sample (8 microns thick), it was found that reducing the pore dimensions from 17 nanometers to 0.77 nanometers, respectively, only decreased intrinsic ambient-temperature membrane ionic conductivity 20-fold. The added resistance of the membrane film may be further overcome using a thinner membrane film supported by a CELGARD or any other membrane support forming a hybrid separator. Additional porogens may also be added to the membrane layer forming a composite membrane to increase porosity and reduce resistance. From the data presented above, the ionic conductivity of the hybrid separator that included a 2-micrometer thick membrane film was only 3-fold lower than for the CELGARD alone.

Without being restricted to any particular theory, it is believed that owing to the rigidity of the polymer scaffold in the membrane layer and its lack of lithium ion coordinating chemical functionality, the ionic current is solely carried by the solvent within the pores. Polymer chain dynamics, which are orders of magnitude slower, no longer dictate the membrane's ionic conductivity.

Metal-Blocking Testing of Hybrid Separator

Figure 2C:
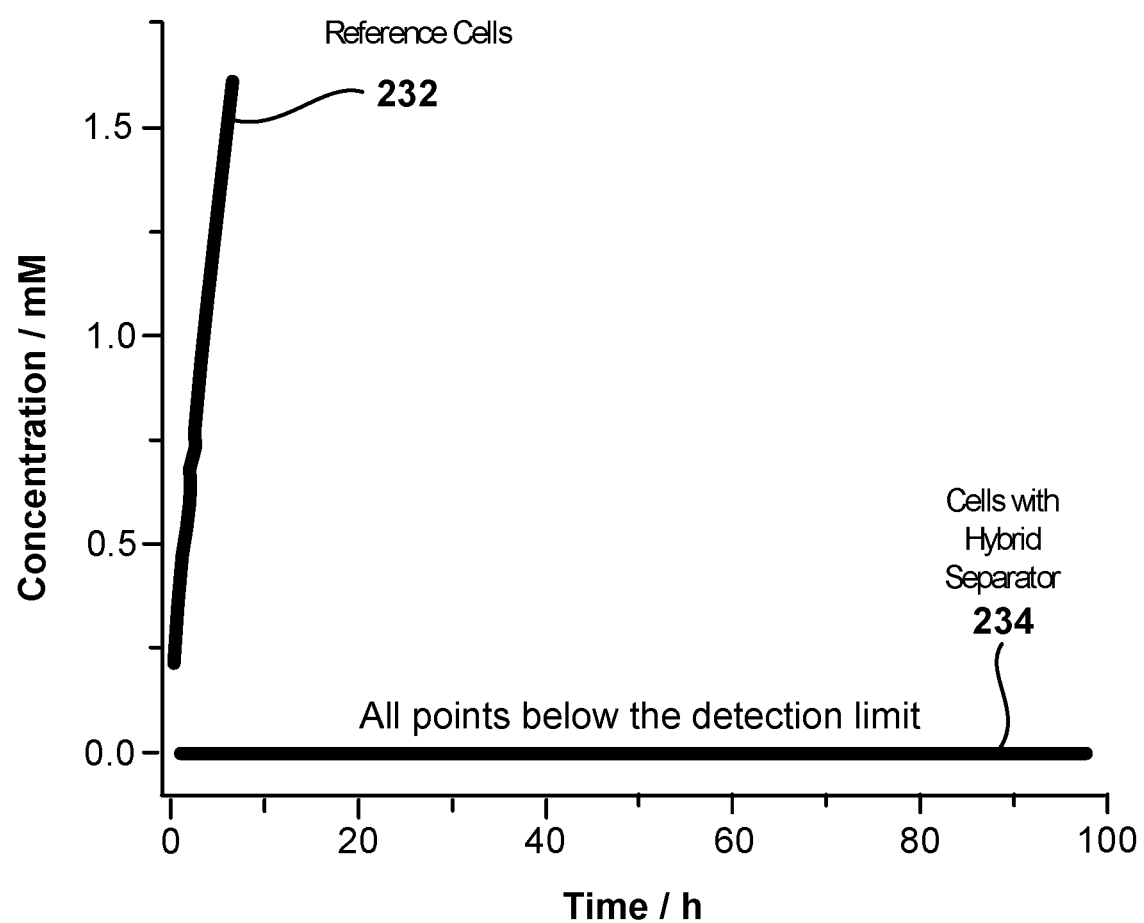

Membrane crossover experiments in H-cells were performed to quantify transition metal-blocking ability of a hybrid separator (i.e., the membrane layer coated on CELGARD) vs. CELGARD 2325 film only. Specifically, H-cells were assembled with dissolved manganese acetylacetonate (Mn(acac)$_3$) in an electrolyte (20 or 50 mM of Mn(acac)$_3$ in 2:1 DEC:EC with 1.0 M LiPF$_6$) on the retentate side and transition metal-free electrolyte on the permeate side. The concentration of Mn(acac)$_3$ over time was then monitored electrochemically on the permeate side using cyclic voltammetry, where current could be correlated to concentration of Mn(acac)$_3$ via a simple calibration curve. The results are shown in FIG. 2C, with line 232 representing the reference cells assembled with the CELGARD film only and line 234 representing test cells assembled with the hybrid separator. The diffusion coefficient of Mn(acac)$_3$ across the membrane was calculated to be 1.8×10$^{-8}$ cm$^2$/s for CELGARD (which was 25 micrometers thick). In the case of the hybrid separator, no discernable trace of Mn(acac)$_3$ was detectable electrochemically in the permeate over the course of 4 days (0.2 mM detection limit) at which point the experiment was halted. In this experiment, the limit of detection for a 27 micrometer-thick hybrid separator would have allowed the evaluation of a diffusion coefficient of 1.8×10$^{-10}$ cm$^2$/s (i.e., >100-fold reduction). From these considerations, the upper limit of Mn(acac)3 diffusive permeability within the 2-micrometer thick membrane film layer could be estimated 1.3×10$^{-11}$ cm$^2$/s (>1000-fold reduction). This is compelling evidence that transition metal complexes are screened by a size-sieving mechanism within ionically-percolating micropore network of the membrane film.

Stability Testing of Hybrid Separator

Figure 2D:
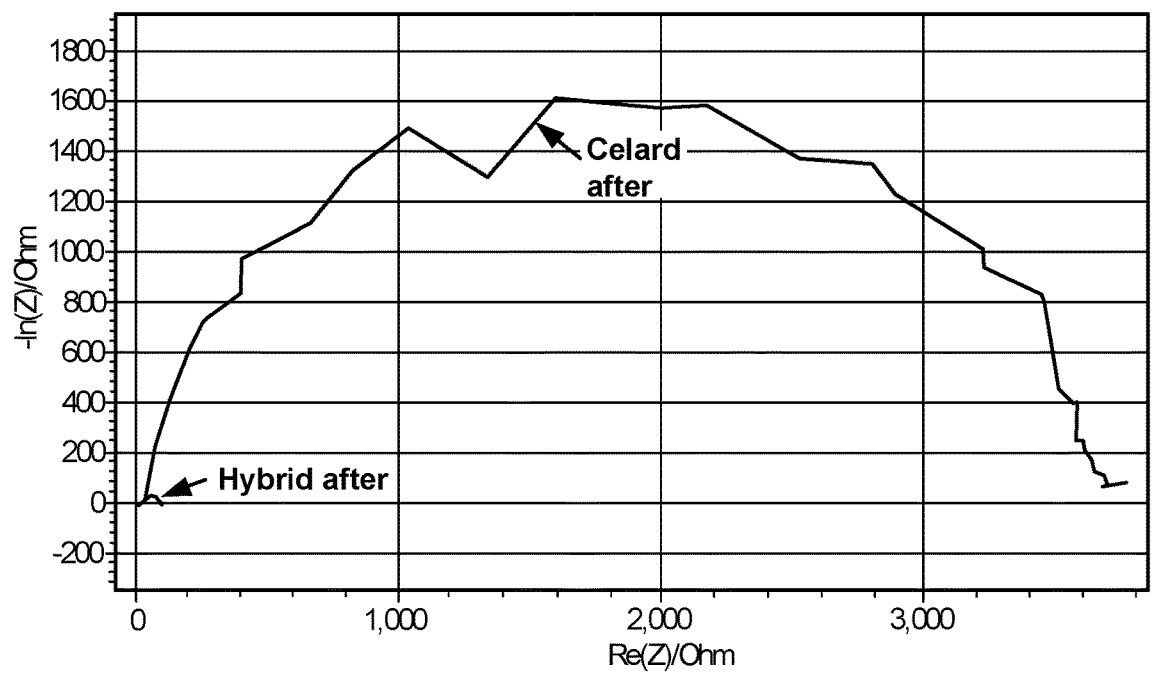
Figure 2E:
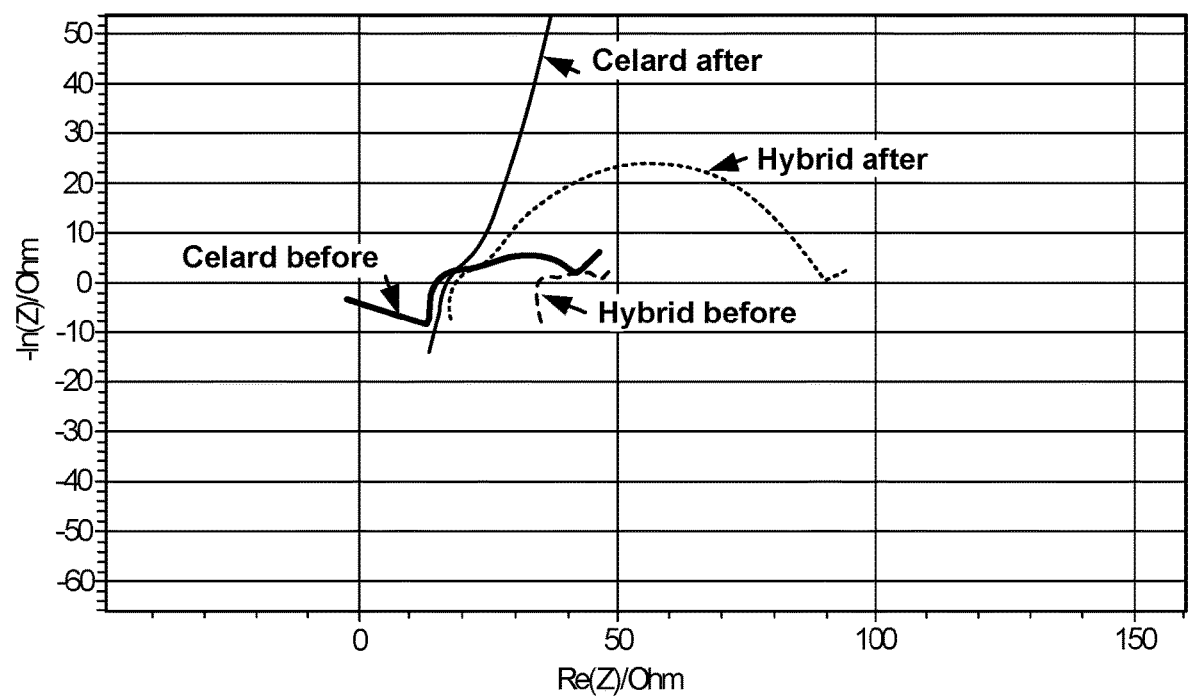

Further support for the advantages of transition metal-blocking separators was obtained by accelerated shelf-life studies of Li-ion full cells. Cells were assembled with graphite anodes and LMO cathodes, 1:1 EC:DEC with 1.0 M LiPF$_6$ was used as electrolyte, and either CELGARD 2325 or a hybrid separator. After formation cycles, the cells were subject to electrochemical impedance spectroscopy (EIS) at room temperature then held at 60° C. for 12 h after which they were cooled to room temperature and again subjected to EIS. The results, shown in FIG. 2D with a close-up of the high frequency region in FIG. 2E, indicate a large growth in resistance for the cell containing the CELGARD 2325 separator and only a slight resistance increase for the cell containing the hybrid separator after heating. Deposition of transition metals, leached from the positive electrode, on the negative electrode is known to cause large increases in cell resistance such as those observed here.

Example 2: Screening of Transition Metal Complexes

Figure 6:
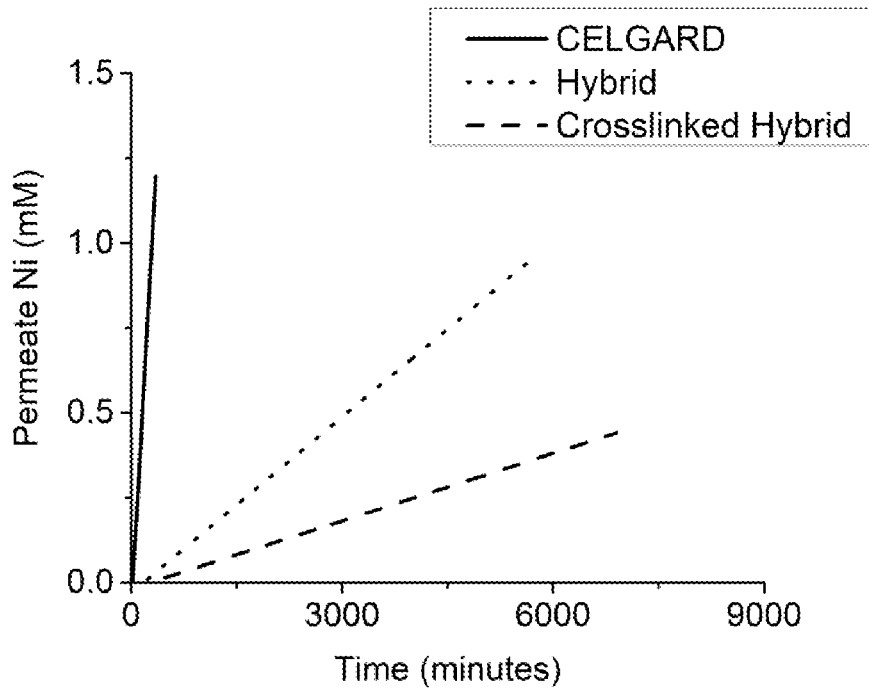
FIG. 6 illustrates nickel permeation across various separators.
Figure 7:
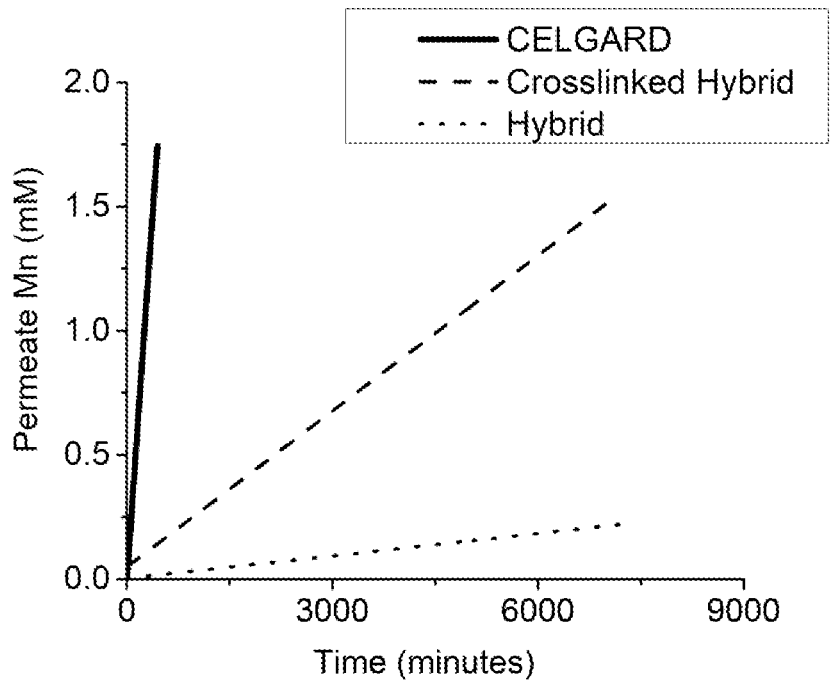
FIG. 7 illustrates manganese permeation across various separators.
Figure 8:
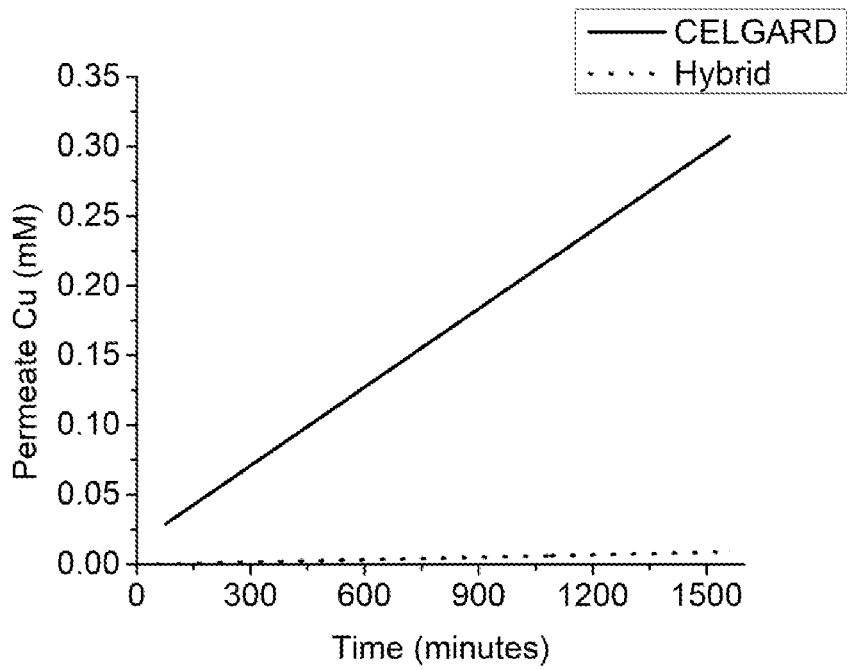
FIG. 8 illustrates copper permeation across various separators.
Figure 9:
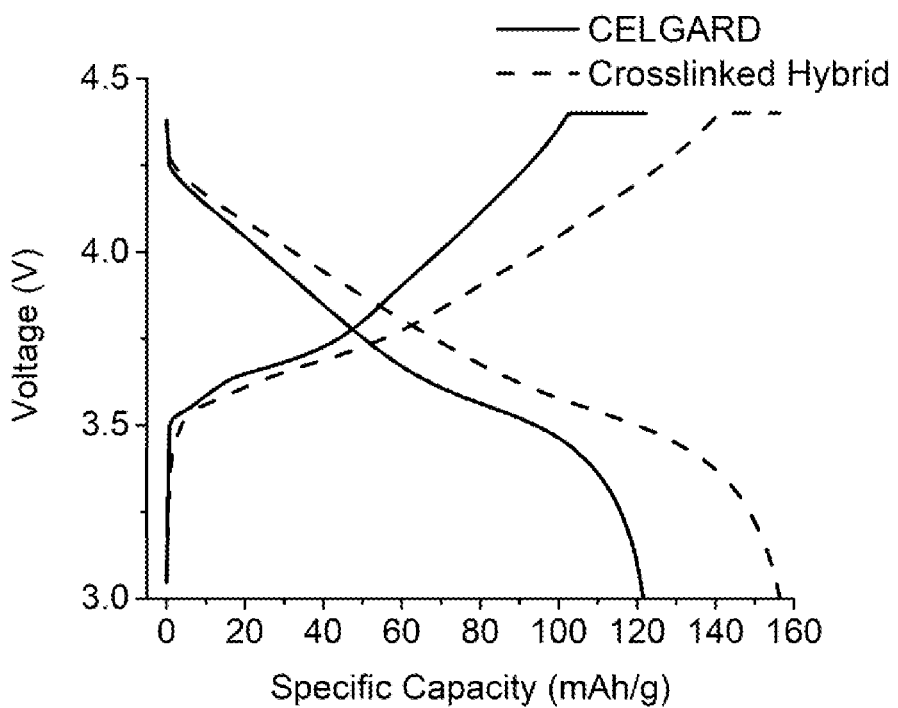
FIG. 9 illustrates voltage vs. capacity plots for full coin cells with graphite anode and NMC 622 cathode to compare the effect of transition-metal blocking in a battery application of a crosslinked hybrid separator (i.e., the membrane layer coated on CELGARD) vs. CELGARD 1611 film only.
Figure 10:
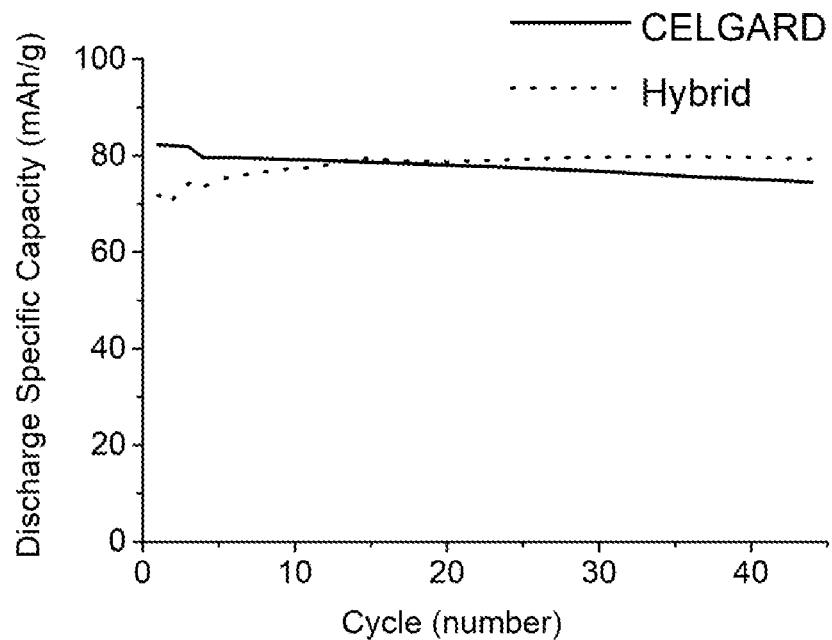
FIG. 10 illustrates battery cycling lifetime tests performed in full coin cells with graphite anode and LMO cathode to compare the effect of transition-metal blocking in a battery application of a crosslinked hybrid separator (i.e., the membrane layer coated on CELGARD) vs. CELGARD 1611 film only.
Figure 11:
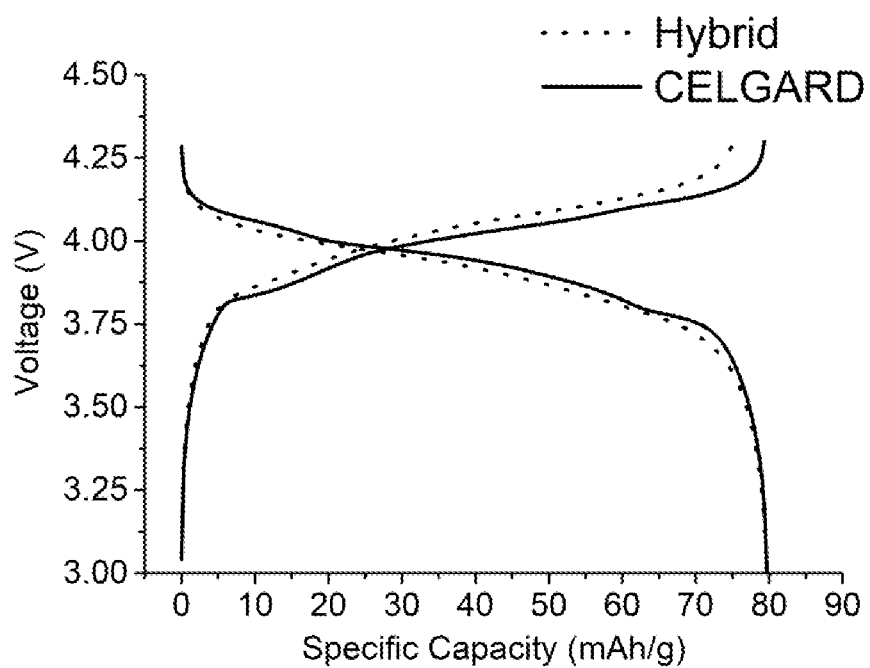
FIG. 11 illustrates voltage vs. capacity plots for full coin cells with graphite anode and LMO cathode to compare the effect of transition-metal blocking in a battery application of a hybrid separator (i.e., the membrane layer coated on CELGARD) vs. CELGARD 1611 film only.

Membrane crossover experiments in H-cells were performed to quantify transition metal-blocking ability of a hybrid separator and a crosslinked hybrid separator (i.e., the membrane layer coated on CELGARD) vs. CELGARD 1611 OR 2400 film alone. Specifically, individual H-cells were assembled with dissolved manganese (II) bis(trifluoromethanesulfonyl)imide (Mn(TFSI)$_2$), nickel(II) bis(trifluoromethanesulfonyl)imide (Ni(TFSI)$_2$), and copper bis(trifluoromethanesulfonyl)imide (CuTFSI) in an electrolyte (10 or 50 mM of $Mn(TFSI)_2$, $Ni(TFSI)_2$ or $Cu(TFSI)_2$ in 1:1 EC:DEC with 1.0 M $LiPF_6$) on the retentate side and transition metal-free electrolyte on the permeate side. The concentration of Mn, Ni, or Cu over time was then monitored on the permeate side using inductively coupled plasma optical emission spectroscopy, where periodic aliquots were analyzed for their concentration of Mn, Ni, or Cu. The results are shown in FIG. 6, FIG. 7, and FIG. 8. The diffusion coefficients of Mn, Ni, and Cu across the membrane were calculated to be $7.20 \times 10^{-8}$ $cm^2/s$, $6.44 \times 10^{-8}$ $cm^2/s$, and $1.55 \times 10^{-9}$ $cm^2/s$, respectively, for CELGARD (which was 16 or 24 micrometers thick; consistent thickness was used to compare the performance of CELGARD vs. hybrid separator for individual metals). In the case of the hybrid separator (17.5 or 26.5 micrometers thick), the diffusion coefficients for Mn, Ni, and Cu across the membrane were calculated to be $5.98 \times 10^{-10}$ $cm^2/s$ (>120-fold reduction), $3.63 \times 10^{-9}$ $cm^2/s$ (>17-fold reduction), and $7.14 \times 10^{-11}$ $cm^2/s$ (>21-fold reduction), respectively. In the case of the crosslinked hybrid separator (17.5 micrometers thick), the diffusion coefficients for Mn and Ni across the membrane were calculated to be $4.14 \times 10^{-9}$ $cm^2/s$ (>17-fold reduction) and $1.45 \times 10^{-9}$ $cm^2/s$ (>44-fold reduction), respectively. This is compelling evidence that transition metal complexes are screened by a size-sieving mechanism within the ionically-percolating micro-pore network of the membrane film.

Figure 4:
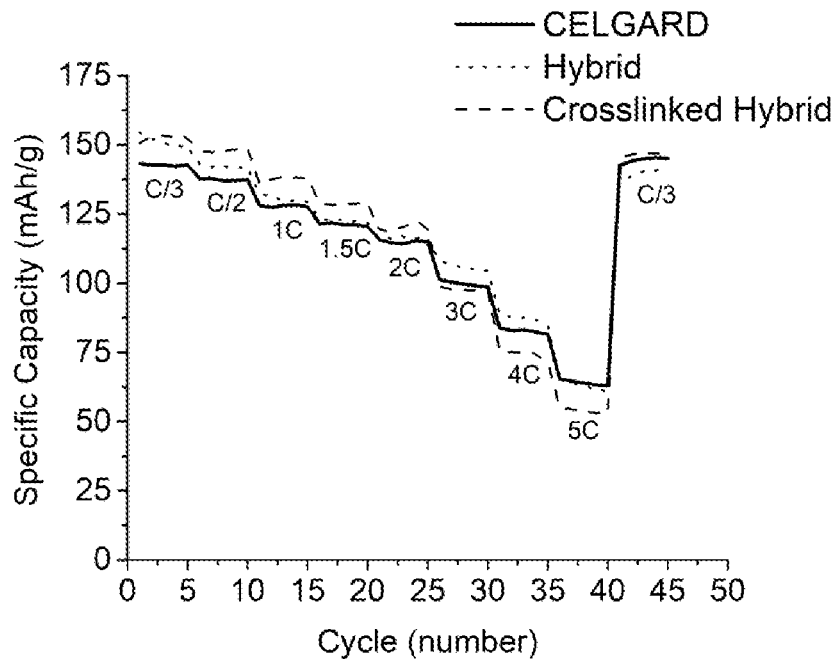
FIG. 4 illustrates battery cycling for full coin cells with a hybrid separator and a crosslinked hybrid separator (i.e., the membrane layer coated on CELGARD) vs. CELGARD 1611 film only.

Battery cycling rate tests were performed in full coin cells to compare the power performance for various discharge rates of a hybrid separator and a crosslinked hybrid separator (i.e., the membrane layer coated on CELGARD) vs. CELGARD 1611 film only. Specifically, full cells were constructed using a 316SS 2032 coin cell geometry. A 316SS wave spring of 15 mm diameter and 1.4 mm height was placed inside the positive cap of the coin cell, a 316SS spacer of 1.5 mm thickness was placed on top of the wave spring. A 622 nickel manganese cobalt on aluminum cathode of 14.25 mm diameter was centered on top of the spacer. 50 µl of electrolyte (1:1 EC:DEC with 1.0 M $LiPF_6$ and 1% vinylene carbonate) was applied onto the cathode. The separator or hybrid separator (19 mm diameter) was placed on top of the cathode and 50 µl of electrolyte (1:1 EC:DEC with 1.0 M $LiPF_6$ and 1% vinylene carbonate) was applied. Lastly, a graphite on copper anode of 15 mm diameter was centered on the stack and the negative cap placed on top and crimped to the positive cap. Cells were charged at a constant current C-rate of C/5 to 4.4 Volts then a constant voltage step at 4.4V with a cutoff current of C/60. The cells were discharged at various C-Rates (5 times per rate): C/3, C/2, 1C, 1.5C, 2C, 3C, 4C, 5C, and then again C/3. The charge protocol mentioned was kept constant for each cycle. The results are shown in FIG. 4. The hybrid separator and CELGARD are analogous in discharge capacity retention with increasing discharge rate, no power losses are anticipated with the hybrid separator vs. CELGARD. The crosslinked hybrid separator demonstrates this merit of performance until the discharge rate of 4C, where it exhibits slightly higher resistance compared to CELGARD. This is compelling evidence that power performance is not lost with a size-sieving micro-pore network.

Battery cycling lifetime tests were performed in full coin cells to compare the effect of transition-metal blocking in a battery application of a crosslinked hybrid separator (i.e., the membrane layer coated on CELGARD) vs. CELGARD 1611 film only. Specifically, full cells were constructed using a 2032 coin cell geometry. A 316SS wave spring of 15 mm diameter and 1.4 mm height was placed inside the positive cap of the coin cell and a 316SS spacer of 1.5 mm thickness was placed on top of the wave spring. A 622 nickel manganese cobalt (NMC622) on aluminum cathode of 14.25 mm diameter was centered on top of the spacer. 500 ul of electrolyte (1:1 EC:DEC with 1.0 M $LiPF_6$ and 1% VC) was applied onto the cathode. The membrane of test (19 mm diameter) was placed on top of the cathode and 500 ul of electrolyte (1:1 EC:DEC with 1.0 M $LiPF_6$ and 1% VC) was applied. Lastly, a graphite on copper anode of 15 mm diameter was centered on the stack and the negative cap placed on top and crimped to the positive cap. Cells were put through a formation cycling protocol of 4 charge and discharge cycles between 3-4.2V at a C-rate of C/10. Lifetime cycling was performed between 3-4.4V with a constant current charge of C/3 followed by a 4.4V constant voltage step with a current cutoff of C/60, and a C/3 discharge. The results are shown in FIG. 2. The crosslinked hybrid separator outperforms CELGARD by >30 mAh/g through 80 cycles. Charge-discharge curves were taken at cycle 30 and the results are shown in FIG. 3, here the crosslinked hybrid separator shows superior performance vs. CELGARD. This is compelling evidence that transition metal complexes screened by size-sieving membranes translates to real lifetime improvements in battery application.

Figure 5:
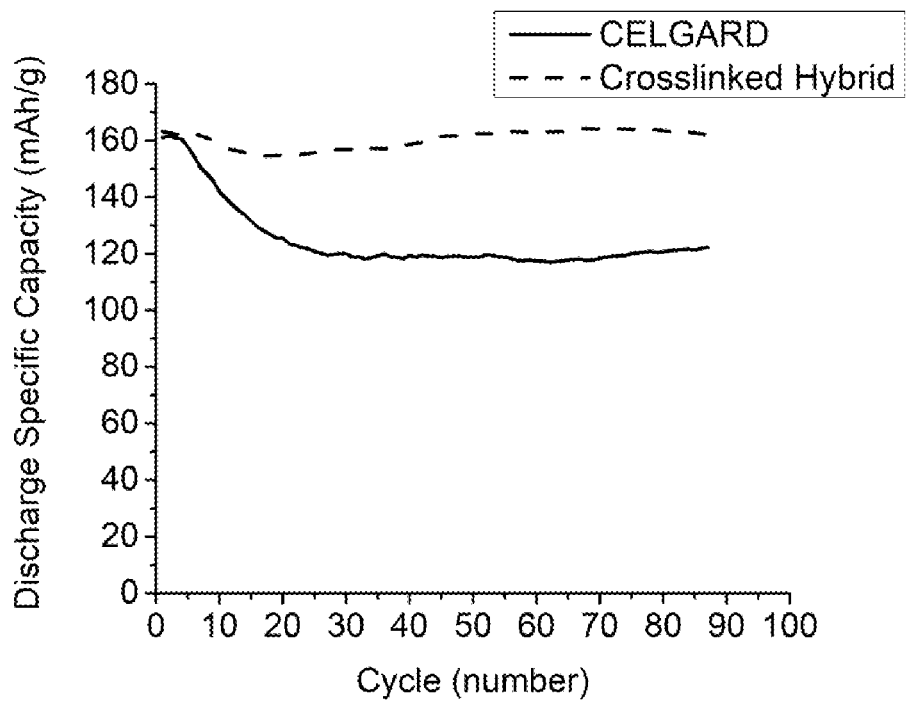
FIG. 5 illustrates battery cycling lifetime tests performed in full coin cells with graphite anode and NMC 622 cathode to compare the effect of transition-metal blocking in a battery application of a crosslinked hybrid separator (i.e., the membrane layer coated on CELGARD) vs. CELGARD 1611 film only.

Battery cycling lifetime tests were performed in full coin cells to compare the effect of transition-metal blocking in a battery application of a hybrid separator (i.e., the membrane layer coated on CELGARD) vs. CELGARD 2400 film only. Specifically, full cells were constructed using a 2032 coin cell geometry. A 316SS wave spring of 15 mm diameter and 1.4 mm height was placed inside the positive cap of the coin cell, a 316SS spacer of 1.5 mm thickness was placed on top of the wave spring. A lithium manganese oxide (LMO) on aluminum cathode of 14.25 mm diameter was centered on top of the spacer. 500 ul of electrolyte (1:1 EC:DEC with 1.0 M $LiPF_6$ and 1% VC, 1% PS, 1% LiBOB) was applied onto the cathode. The membrane of test (19 mm diameter) was placed on top of the cathode and 500 ul of electrolyte (1:1 EC:DEC with 1.0 M $LiPF_6$ and 2% VC, 1% PS, 1% LiBOB) was applied. Lastly, a graphite on copper anode of 15 mm diameter was centered on the stack and the negative cap placed on top and crimped to the positive cap. Cells were put through a formation cycling protocol of 3 charge and discharge cycles between 3-4.2V at a C-rate of C/10. Lifetime cycling was performed between 3-4.3V with a constant current charge of C/3 followed by a 30 minute 4.3V constant voltage step, and a C/3 discharge. The results are shown in FIG. 4. The hybrid separator has similar capacity fade as CELGARD but outperforms CELGARD at cycle 12. Charge-discharge curves were taken at cycle 10 and the results are shown in FIG. 5, here the hybrid separator has similar performance compare to CELGARD. This is compelling evidence that transition metal complexes screened by size-sieving membranes translates to real lifetime improvements in battery applications.

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. An electrochemical cell comprising:
a positive electrode;
a negative electrode;
a separator disposed between the positive electrode and the negative electrode, wherein the separator provides electronic isolation between the positive electrode and the negative electrode, wherein the separator comprises a first membrane layer; and
an electrolyte comprising a first species and a second species, wherein at least a portion of the electrolyte is disposed within the separator,
wherein the separator, with at least the portion of the electrolyte disposed within the separator, is permeable to the first species providing ionic communication between the positive electrode and the negative electrode,
wherein the separator, with at least the portion of the electrolyte disposed within the separator, is substantially impermeable to the second species comprising an element of the electrochemical active material of the positive electrode,
wherein the first species is selected from the group consisting of $H^+$, $Li^+$, $Na^+$, $K^+$, $Rb^+$, $Cs^+$, $F^-$, $Cl^-$, $Br^-$, $I^-$, $BF_4^-$, $PF_6^-$, $AsF_6^-$, $ClO_4^-$, methanesulfonate, trifluoromethanesulfonate, tris(pentafluoroethyl)trifluorophosphate, bis(fluorosulfonyl)imide, cyclo-difluoromethane-1,1-bis(sulfonyl)imide, cyclo-hexafluoropropane-1,1-bis(sulfonyl)imide, bis(trifluoromethanesulfonylimide), bis(perfluoroethanesulfonyl)imide, bis(oxalate)borate, difluoro(oxalate)borate, bis(fluoromalonato)borate, tetracyanoborate, dicyanotriazolate, dicyano-trifuloromethyl-imidazolate, dicyano-pentafuoroethyl-imidazoleate, and ion pairs thereof,
wherein the second species comprises at least one of an atom, an ion, an ion pair, and a molecule, each independently selected from the group consisting of Mn, Fe, Cu, and Ni,
wherein the separator further comprises a membrane support laminated to the first membrane layer, and wherein the membrane support is permeable to the second species,
wherein the membrane support is a porous polymer selected from the group consisting of fluoro-polymeric fibers of polyethylene-co-tetrafluoroethylene (PETFE) and poly(ethylenechloro-co-trifluoroethylene) (e.g., a fabric woven from these used either by itself or laminated with a fluoropolymeric microporous film), polyvinylidene difluoride, polystyrenes, polyarylethersulfones, polyvinyl chlorides, polypropylene, polyethylene, polyamides, polyimides, polyacrylics, polyacetals, polycarbonates, polyesters, polyetherimides, polyimides, polyketones, polyphenylene ethers, polyphenylene sulfides, polymethylpentene, polysulfones non-woven glass, glass fiber materials, ceramics, metal oxides, and composites of organic and inorganic species, and
wherein an average pore diameter of the membrane support is at least about 10 nanometers.

2. The electrochemical cell of claim 1, comprising:
the positive electrode;
the negative electrode;
the separator disposed between the positive electrode and the negative electrode, wherein the separator provides electronic isolation between the positive electrode and the negative electrode, wherein the separator comprises a first membrane layer; and
the electrolyte comprising the first species and the second species, wherein the first species is an ion having a charge of +1 or −1, wherein the first and second species are different, and wherein the electrolyte is in electrical contact with both the positive and negative electrodes, wherein the first membrane layer is permeable to the first species and substantially impermeable to the second species.

3. The electrochemical cell of claim 1, wherein the first membrane layer has an average pore diameter of from 0.1 nm to 10 nm.

4. The electrochemical cell of claim 1, wherein the first membrane layer has an average pore diameter of from 0.1 nm to 1 nm.

5. The electrochemical cell of claim 1, wherein the first membrane layer has a surface area of from 100 $m^2$/g to 3000 $m^2$/g, as measured by nitrogen adsorption BET.

6. The electrochemical cell of claim 1, wherein the first membrane layer comprises a polymer of intrinsic microporosity.

7. The electrochemical cell of claim 1, wherein the first membrane layer comprises a planar species and a linker having a site of contortion, wherein the linker is selected from the group consisting of a spiro group, a bridged ring moiety, and a sterically congested single covalent bond.

8. The electrochemical cell of claim 7, wherein the planar species is represented by a formula:

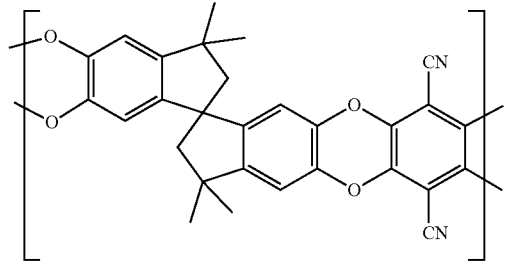

9. The electrochemical cell of claim 1, wherein the first species comprises an ion having a charge of +1.

10. The electrochemical cell of claim 1, wherein the first species is selected from the group consisting of $H^+$, $Li^+$, $Na^+$ and $K^+$.

11. The electrochemical cell of claim 1, wherein the first species is selected from the group consisting of $F^-$, $Cl^-$, $Br^-$, $I^-$, $BF_4^-$, $PF_6^-$, $AsF_6^-$, $ClO_4^-$, methanesulfonate, trifluoromethanesulfonate, tris(pentafluoroethyl)trifluorophosphate, bis(fluorosulfonyl)imide, cyclo-difluoromethane-1,1-bis(sulfonyl)imide, cyclo-hexafluoropropane-1,1-bis(sulfonyl)imide, bis(trifluoromethanesulfonylimide), bis(perfluoroethanesulfonyl)imide, bis(oxalate)borate, difluoro(oxalate)borate, bis(fluoromalonato)borate, tetracyanoborate, dicyanotriazolate, dicyano-trifuloromethyl-imidazolate, and dicyano-pentafuoroethyl-imidazoleate.

12. The electrochemical cell of claim 1, wherein the ion is a metal ion, wherein the second species further comprises a ligand binding the metal ion.

13. The electrochemical cell of claim 12, wherein the ligand is selected from the group consisting of methanesulfonate, trifluoromethanesulfonate, tris(pentafluoroethyl) trifluorophosphate, bis(fluorosulfonyl)imide, cyclo-difluoromethane-1,1-bis(sulfonyl)imide, cyclohexafluoropropane-1,1-bis(sulfonyl)imide, bis(trifluoromethanesulfonylimide), bis(perfluoroethanesulfonyl)imide, bis(oxalate)borate, difluoro(oxalate)borate, bis(fluoromalonato)borate, tetracyanoborate, dicyanotriazolate, dicyano-trifuloromethyl-imidazolate, dicyano-pentafuoroethyl-imidazoleate, acetylacetonate, acetylacetone, and a β-ketoester of the formula RC=OCH$_2$COOR', where R and R' are each independently $C_{1-6}$ alkyl, $C_{6-12}$ aryl, or $C_{1-6}$ alkoxy-$C_{1-6}$ alkyl.

14. The electrochemical cell of claim 1, wherein the second species is selected from the group consisting of manganese (II) bis(trifluoromethanesulfonyl)imide (Mn(TFSI)$_2$), and nickel(II) bis(trifluoromethanesulfonyl)imide (Ni(TFSI)$_2$).

15. The electrochemical cell of claim 1, wherein the membrane support is adjacent to the first membrane layer.

16. The electrochemical cell of claim 1, wherein the first membrane layer is disposed between the membrane support and the positive electrode.

17. The electrochemical cell of claim 16, wherein the separator further comprises a second membrane layer laminated to the membrane support.

18. The electrochemical cell of claim 17, wherein the membrane support is disposed between the first membrane layer and the second membrane layer.

19. The electrochemical cell of claim 17, wherein the second membrane layer is permeable to the first species providing ionic communication between the positive electrode and the negative electrode, and wherein the second membrane layer is substantially impermeable to the second species comprising the element of the electrochemical active material of the positive electrode.

20. The electrochemical cell of claim 17, wherein the second membrane layer comprises a ceramic material selected from the group consisting of aluminum oxide, silicon oxide, silicon carbide, titanium dioxide, magnesium oxide, tin oxide, cerium oxide, zirconium oxide, barium titanite, yttrium oxide, boron nitride, and/or an ion conducting ceramic.

21. The electrochemical cell of claim 1, wherein the first membrane layer directly interfaces the negative electrode and/or the positive electrode.

* * * * *